US008422569B2

(12) United States Patent
Yamanashi et al.

(10) Patent No.: US 8,422,569 B2
(45) Date of Patent: Apr. 16, 2013

(54) ENCODING DEVICE, DECODING DEVICE, AND METHOD THEREOF

(75) Inventors: Tomofumi Yamanashi, Kanagawa (JP); Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 12/863,690

(22) PCT Filed: Jan. 23, 2009

(86) PCT No.: PCT/JP2009/000262

§ 371 (c)(1), (2), (4) Date: Jul. 20, 2010

(87) PCT Pub. No.: WO2009/093466

PCT Pub. Date: Jul. 30, 2009

(65) Prior Publication Data

US 2010/0284455 A1 Nov. 11, 2010

(30) Foreign Application Priority Data

Jan. 25, 2008 (JP) ................................ 2008-015650
May 16, 2008 (JP) ................................ 2008-129711

(51) Int. Cl.
*H04L 27/00* (2006.01)

(52) U.S. Cl.
USPC ........... 375/259; 375/260; 375/240; 375/295; 375/316; 375/341; 375/265

(58) Field of Classification Search .................. 375/259, 375/260, 240, 295, 316, 341, 265
See application file for complete search history.

(56) References Cited

U.S. PATENT DOCUMENTS 5,206,884 A * 4/1993 Bhaskar ........................ 375/254
2003/0172337 A1 9/2003 Tsutsui et al.
(Continued)

FOREIGN PATENT DOCUMENTS

JP 8-263096 10/1996
JP 10-97295 4/1998
(Continued)

*Primary Examiner* — Kenneth Lam
(74) *Attorney, Agent, or Firm* — Greenblum & Bernstein, P.L.C.

(57) ABSTRACT

Provided is an encoding device which divides an input signal into a low-range component and a high-range component and encodes the components in separate encoding units. The encoding device can improve quality of a decoded signal. The encoding device (101) includes: a band division process unit (201) which subjects an input signal to a band division process so as to obtain a lower intermediate-range component lower than a first frequency and a high-range component higher than the first frequency; a low-range encoding unit (202) which suppresses a portion of the lower intermediate-range component higher than a second frequency so as to obtain a low-range component and encodes the low-range component so as to obtain low-range encoded information; an intermediate-range correction unit (203) corrects the intermediate-range component higher than the second frequency among the suppressed lower intermediate-range component so as to obtain a corrected intermediate-range component; an intermediate high-range encoding unit (204) which encodes the corrected intermediate-range component and the high-range component so as to obtain intermediate high-range encoded information; and a multiplexing unit (205) which multiplexes the low-range encoded information and the intermediate high-range encoded information so as to obtain encoded information.

9 Claims, 21 Drawing Sheets

U.S. PATENT DOCUMENTS

| | | | | |
|---|---|---|---|---|
| 2006/0149538 | A1* | 7/2006 | Lee et al. | 704/219 |
| 2007/0208565 | A1* | 9/2007 | Lakaniemi et al. | 704/268 |
| 2007/0299669 | A1* | 12/2007 | Ehara | 704/262 |
| 2008/0010062 | A1* | 1/2008 | Son et al. | 704/219 |
| 2009/0271204 | A1* | 10/2009 | Tammi | 704/500 |
| 2010/0228541 | A1* | 9/2010 | Oshikiri | 704/203 |

FOREIGN PATENT DOCUMENTS

| | | |
|---|---|---|
| JP | 2002-311963 | 10/2002 |
| JP | 2005-114814 | 4/2005 |
| JP | 2006-119301 | 5/2006 |
| JP | 2006-189836 | 7/2006 |

* cited by examiner

ENCODING DEVICE, DECODING DEVICE, AND METHOD THEREOF

TECHNICAL FIELD

The present invention relates to an encoding apparatus, decoding apparatus, and encoding and decoding methods used in a communication system for encoding and transmitting signals.

BACKGROUND ART

The development of communication infrastructures in recent years has allowed large volumes of moving image data to be transmitted and received through telephone lines, in addition to simple speech signals. In this case, in order to use from speech signals that can be transmitted even at a low bit rate to moving image data that needs to be transmitted at a high bit rate in the same framework and improve the efficiency of lines, for example, a variable bit rate transmission scheme is developed.

Also, in speech signal or audio signal coding, scalable coding techniques have been developed whereby it is possible to decode speech signals and audio signals from part of encoded information and suppress the degradation of sound quality even in a case where packet loss occurs (e.g. see Patent Document 1).

As a representative example of these scalable coding techniques, a method is disclosed for realizing scalability on the frequency axis by splitting an input signal in the frequency domain into the lower band component and the higher band component (and the middle band component) and encoding and transmitting the signal of each band (e.g. see Patent Document 2, Patent Document 3 and Patent Document 4).

Patent Document 1: Japanese Patent Application Laid-Open No. HEI10-97295

Patent Document 2: Japanese Patent Application Laid-Open No. 2005-114814

Patent Document 3: Japanese Patent Application Laid-Open No. 2006-189836

Patent Document 4: Japanese Patent Application Laid-Open No. 2006-119301

DISCLOSURE OF INVENTION

Problems to be Solved by the Invention

Above Patent Documents 2, 3 and 4 disclose a configuration of, first, applying band split processing to an input signal (e.g. a signal of 32 kHz sampling frequency) by QMF (Quadrature Mirror Filter) and so on, to split the input signal into the signal of the lower band component and the signal of the higher band component. Alternatively, the above documents also disclose a configuration of splitting an input signal into three signals including the signal of the lower band component, the signal of the higher band component and further the signal of the middle band component. In the following, a case will be considered where ITU-T recommendation G729.1 coding is used in an encoding section in the first layer (i.e. the lowermost layer).

A G.729.1 encoding section applies a low-pass filter to an input signal of 16 kHz sampling frequency subjected to QMF analysis, to provide frequency characteristics of up to the 7 kHz band, and encodes the signal limited to up to the 7 kHz band. However, for example, even if an input signal includes frequency components up to the 8 kHz band, the G.729.1 encoding section encodes the components up to the 7 kHz band and does not encode the components of the 7 to 8 kHz band. Therefore, a different encoding section from the G.729.1 encoding section needs to encode the components of the 7 to 8 kHz band.

Therefore, a method of stopping low-pass filter operations inside the G.729.1 encoding section is possible in order to prevent the components of the 7 to 8 kHz band from being lost due to the limitation to up to the 7 kHz band. However, if such configuration is employed, due to the fact that the low-pass filter is not applied to components equal to or lower than the 7 kHz band, the normal performance of the G.729.1 encoding section is not secured.

Also, a configuration is naturally possible where the components of the 7 to 8 kHz band (equal to or higher than 7 kHz and lower than 8 kHz) are acquired from a signal of 16 kHz sampling frequency received as input in the G.729.1 encoding section. For example, by performing orthogonal transform processing such as MDCT (Modified Discrete Cosine Transform) on a signal of the 0 to 8 kHz band received as input in the G.729.1 encoding section, it is possible to calculate frequency components of the 7 to 8 kHz band. However, if the above configuration is employed, it is necessary to newly calculate MDCT coefficients for components of 0 to 8 kHz, in addition to MDCT calculation performed in the G.729.1 encoding section, and therefore the amount of calculations increases significantly.

It is therefore an object of the present invention to provide an encoding apparatus, decoding apparatus, and encoding and decoding methods, in a configuration of splitting the band of an input signal into the lower band component and the higher band component by processing such as QMF and encoding these components in separate encoding sections, for suppressing the amount of calculations and reconstructing and encoding a band component lost by adopting a low-pass filter in an encoding section for the lower band component, and for improving quality of decoded signals. Here, the techniques of the present invention do not refer to simple inverse filtering processing in signal processing, but refer to specific quality improvement techniques for speech and audio signals.

Means for Solving the Problem

The encoding apparatus of the present invention employs a configuration having: a band split section that performs band split processing of an input signal and provides a lower/middle band component lower than a first frequency and a higher band component equal to or higher than the first frequency; a lower band encoding section that provides a lower band component by suppressing a part equal to or higher than a second frequency in the lower/middle band component, and provides lower band encoded information by encoding the lower band component; a middle band correcting section that corrects a middle band component equal to or higher than the second frequency in the suppressed lower/middle band component, and provides a corrected middle band component; and a middle/higher band encoding section that encodes the corrected middle band component and the higher band component, and provides middle/higher band encoded information.

The decoding apparatus of the present invention employs a configuration having: a receiving section that receives lower band encoded information and middle/higher band encoded information, the lower band encoded information encoding a lower band component acquired by suppressing a part equal to or higher than a second frequency in a lower/middle band component, which is lower than a first frequency and which is acquired by splitting a band of an input signal in an encoding apparatus, and the middle/higher band encoded information encoding a corrected middle band component acquired by correcting a middle band component equal to or higher than the second frequency in the suppressed lower/middle band component, and encoding a higher band component, which is equal to or higher than the first frequency and which is acquired by splitting the band; a lower/middle band decoding section that decodes the lower band encoded information and provides a decoded lower band spectrum; and a higher band decoding section that decodes the middle/higher band encoded information using the decoded lower band spectrum and provides a decoded higher band signal and decoded middle band spectrum.

The encoding method of the present invention includes the steps of: performing band split processing of an input signal and providing a lower/middle band component lower than a first frequency and a higher band component equal to or higher than the first frequency; providing a lower band component by suppressing a part equal to or higher than a second frequency in the lower/middle band component, and providing lower band encoded information by encoding the lower band component; correcting a middle band component equal to or higher than the second frequency in the suppressed lower/middle band component, and providing a corrected middle band component; and encoding the corrected middle band component and the higher band component, and providing middle/higher band encoded information.

The decoding method of the present invention includes the steps of: receiving lower band encoded information and middle/higher band encoded information, the lower band encoded information encoding a lower band component acquired by suppressing a part equal to or higher than a second frequency in a lower/middle band component, which is lower than a first frequency and which is acquired by splitting a band of an input signal in an encoding apparatus, and the middle/higher band encoded information encoding a corrected middle band component acquired by correcting a middle band component equal to or higher than the second frequency in the suppressed lower/middle band component, and encoding a higher band component, which is equal to or higher than the first frequency and which is acquired by splitting the band; decoding the lower band encoded information and providing a decoded lower band spectrum; and decoding the middle/higher band encoded information using the decoded lower band spectrum and providing a decoded higher band signal and decoded middle band spectrum.

Advantageous Effect of the Invention

According to the present invention, in a configuration of splitting the band of an input signal into the lower band component and the higher band component by processing such as QMF and encoding these components in separate encoding sections, it is possible to suppress the amount of calculations and reconstruct and encode a band component lost by adopting a low-pass filter in an encoding section for the lower band component, and improve the quality of decoded signals.

BEST MODE FOR CARRYING OUT THE INVENTION

Embodiments of the present invention will be explained below in detail with reference to the accompanying drawings. Also, an example case will be explained where a speech encoding apparatus and speech decoding apparatus are used as the encoding apparatus and decoding apparatus according to the present invention.

Embodiment 1

Figure 1:
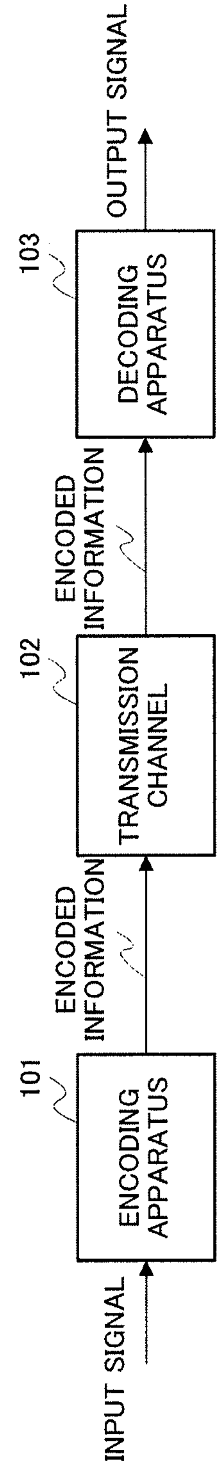
FIG. 1 is a block diagram showing the configuration of a communication system having an encoding apparatus and decoding apparatus according to Embodiment 1 of the present invention.

FIG. 1 is a block diagram showing the configuration of a communication system having the encoding apparatus and decoding apparatus according to Embodiment 1 of the present invention. In FIG. 1, the communication system provides encoding apparatus 101 and decoding apparatus 103, which can communicate with each other via transmission channel 102.

Encoding apparatus 101 divides an input signal every N samples (where N is a natural number) and performs coding per frame comprised of N samples. In this case, an input signal to be encoded is represented by $x_n$ (n=0, . . . , N−1). Here, n represents the (n+1)-th signal element of the input signal divided every N samples. In the following, sample "n" may be omitted to express a signal. For example, $x_n$ (n=0, . . . , N−1) may be abbreviated and expressed as "x."

Encoded input information (i.e. encoded information) is transmitted to decoding apparatus 103 via transmission channel 102.

Decoding apparatus 103 receives and decodes the encoded information transmitted from encoding apparatus 101 via transmission channel 102, and provides an output signal.

Figure 2:
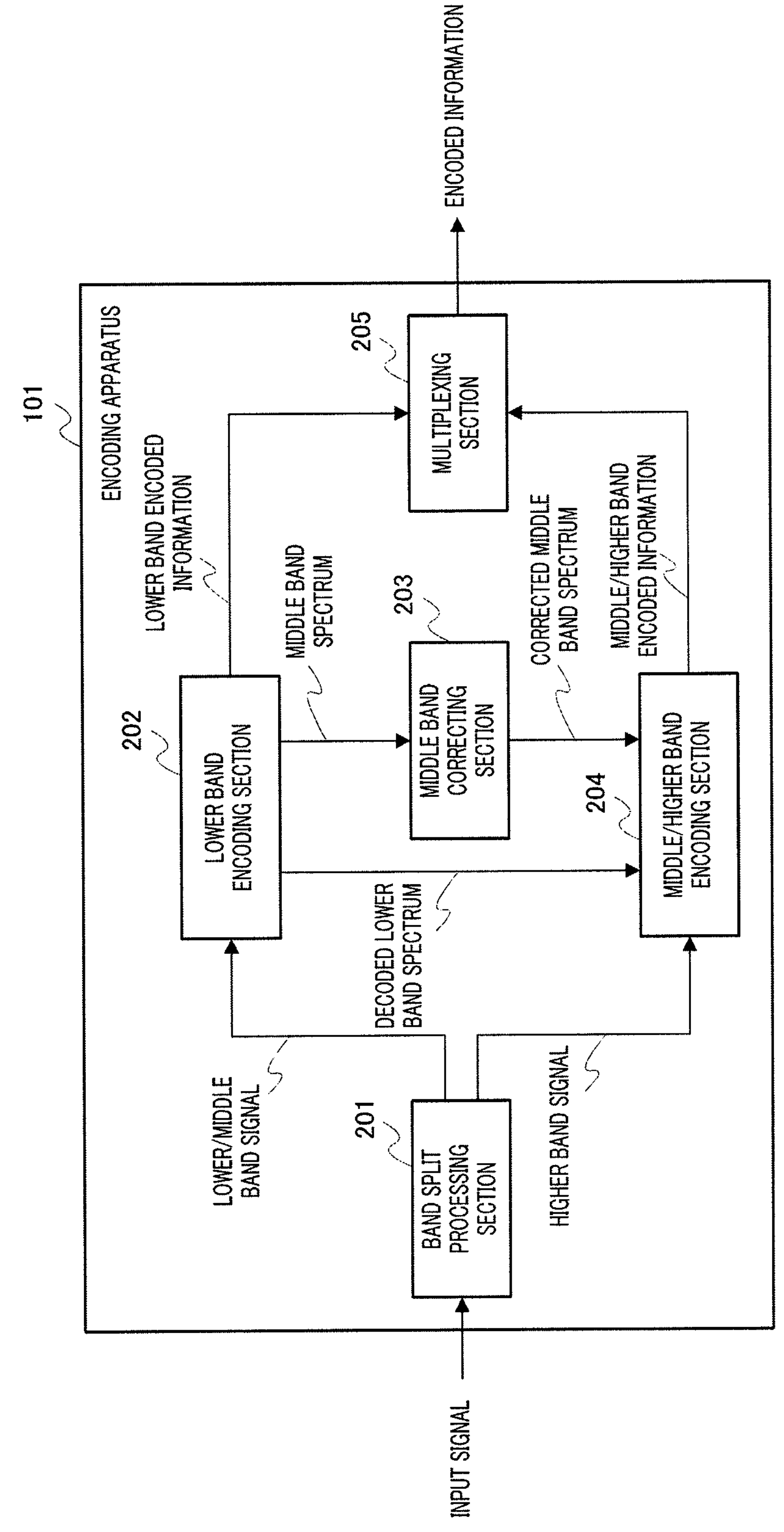
FIG. 2 is a block diagram showing the main configuration inside an encoding apparatus shown in FIG. 1.

FIG. 2 is a block diagram showing the main configuration inside encoding apparatus 101 shown in FIG. 1.

In FIG. 2, encoding apparatus 101 is provided with band split processing section 201, lower band encoding section 202, middle band correcting section 203, middle/higher band encoding section 204 and multiplexing section 205. These sections perform the following operations.

Band split processing section 201 performs band split processing such as QMF on input signal x of sampling frequency $SR_{input}$, and generates lower/middle band signal x_lo and higher band signal x_hi of sampling frequency $SR_{Input}/2$. Here, using an example case where $SR_{Input}$ is 32 kHz, assume that the lower band represents the 0 to 7 kHz band, the middle band represents the 7 to 8 kHz band, and the higher band represents the 8 to 16 kHz band. Further, assume that lower/middle band signal x_lo represents the signal of the 0 to 8 kHz band, and higher band signal x_hi represents the signal of the 8 to 16 kHz band. Band split processing section 201 outputs generated lower/middle band signal x_lo to lower band encoding section 202 and outputs higher band signal x_hi to middle/higher band encoding section 204.

Lower band encoding section 202 suppresses the 7 to 8 kHz part in lower/middle band signal x_lo of the 0 to 8 kHz band received as input from band split processing section 201, encodes the 0 to 7 kHz part, for example, according to ITU-T recommendation G.729.1, and outputs generated lower band encoded information to multiplexing section 205. Further, lower band encoding section 202 outputs frequency components of the middle band (i.e. the 7 to 8 kHz band) calculated in the process of providing the lower band encoded information, to middle band correcting section 203 as middle band spectrum X_mid. Further, lower band encoding section 202 further decodes the generated lower band encoded information and outputs the lower band frequency components of the resulting decoded signal to middle/higher band encoding section 204 as decoded lower band spectrum S_lo(k) ($0 \leqq k < 7$ kHz). In the following, frequency "k" may be omitted to express a spectrum. For example, S_lo(k) ($0 \leqq k < 7$ kHz) may be abbreviated and expressed as S_lo. Lower band encoding section 202 will be described in more detail later.

Middle band correcting section 203 corrects middle band spectrum X_mid received as input from lower band encoding section 202 in the frequency domain, and outputs the resulting spectrum to middle/higher band encoding section 204 as corrected middle band spectrum S_mid. Middle band correcting section 203 will be described in more detail later.

Middle/higher band encoding section 204 encodes corrected middle band spectrum S_mid received as input from middle band correcting section 203 and higher band signal x_hi (of the 8 to 16 kHz band) received as input from band split processing section 201, using decoded lower band spectrum S_lo received as input from lower band encoding section 202, and outputs generated middle/higher band encoded information to multiplexing section 205. Middle/higher band encoding section 204 will be described in more detail later.

Multiplexing section 205 multiplexes the lower band encoded information received as input from lower band encoding section 202 and the middle/higher band encoded information received as input from middle/higher band encoding section 204, and output the multiplex result to transmission channel 102 as encoded information.

Figure 3:
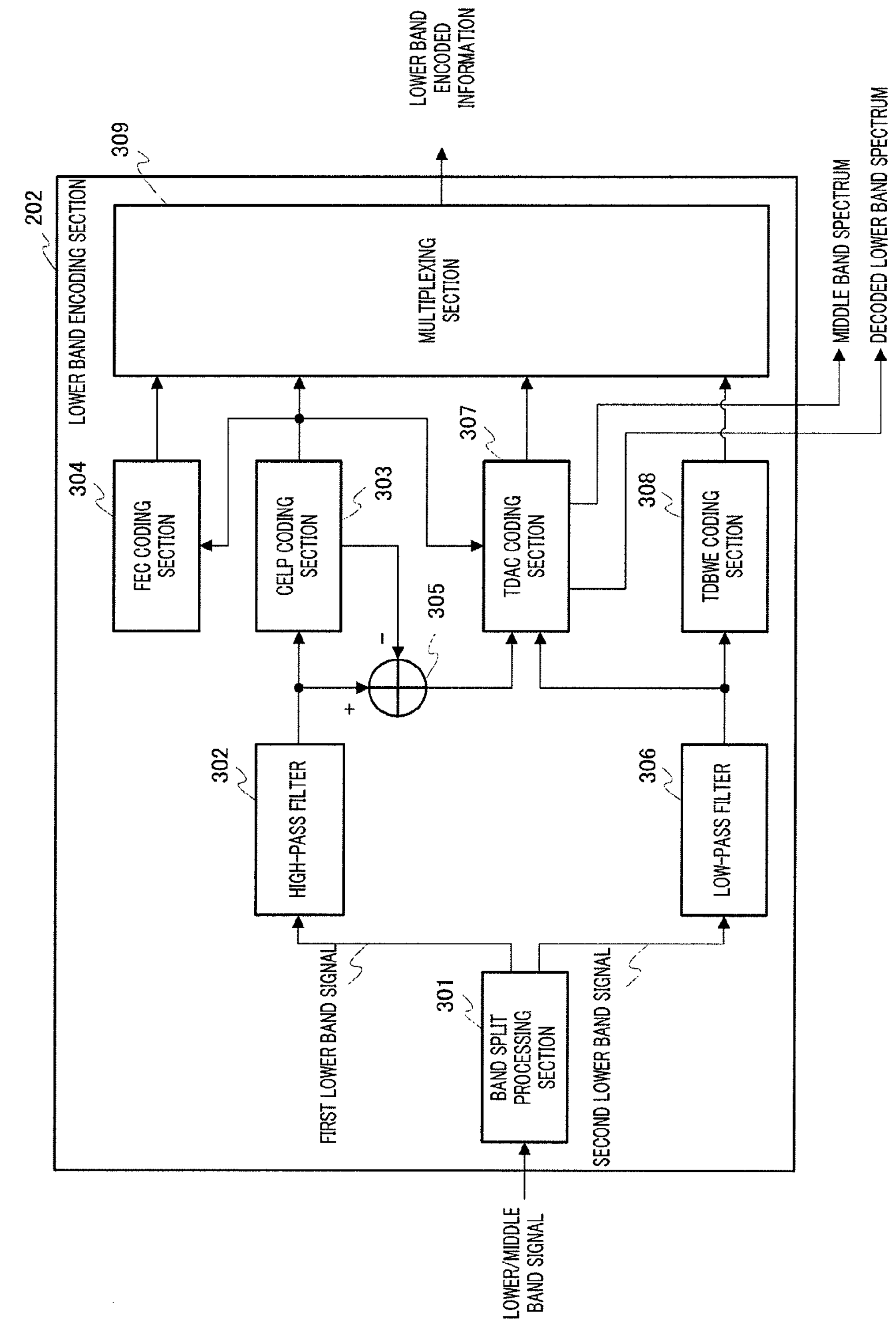
FIG. 3 is a block diagram showing the main configuration inside a lower band encoding section shown in FIG. 2.

FIG. 3 is a block diagram showing the main configuration inside lower band encoding section 202 shown in FIG. 2.

In FIG. 3, lower band encoding section 202 is provided with band split processing section 301, high-pass filter 302, CELP (Code Excited Linear Prediction) coding section 303, FEC (Forward Error Correction) coding section 304, adding section 305, low-pass filter 306, TDAC (Time-Domain Aliasing Cancellation) coding section 307, TDBWE (Time-Domain BandWidth Extension) coding section 308 and multiplexing section 309. These sections perform the following operations.

Similar to band split processing section 201, band split processing section 301 performs band split processing by QMF on lower/middle band signal x_lo received as input from band split processing section 201, and generates the first lower band signal of the 0 to 4 kHz band and the second lower band signal of the 4 to 8 kHz band. Further, band split processing section 301 outputs the generated first lower band signal to high-pass filter 302 and outputs the generated second lower band signal to low-pass filter 306.

High-pass filter 302 suppresses frequency components equal to or less than 0.05 kHz in the first lower band signal received as input from band split processing section 301, and provides and outputs a signal mainly comprised of frequency components higher than 0.05 kHz to CELP coding section 303 and adding section 305 as the filtered first lower band signal.

CELP coding section 303 performs CELP coding of the filtered first lower band signal received as input from high-pass filter 302, and outputs the resulting CELP parameters to FEC coding section 304, TDAC coding section 307 and multiplexing section 309. Here, CELP coding section 303 may output part of the CELP parameters or information provided in the process of finding the CELP parameters, to FEC coding section 304 and TDAC coding section 307. Also, CELP coding section 303 performs CELP decoding of the found CELP parameters and outputs the resulting CELP decoded signal to adding section 305.

FEC coding section 304 finds FEC parameters used in lost frame compensation processing in decoding apparatus 103, using the CELP parameters received as input from CELP coding section 303, and outputs the FEC parameters to multiplexing section 309.

Adding section 305 calculates the difference between the filtered first lower band signal received as input from high-pass filter 302 and the CELP decoded signal received as input from CELP coding section 303, and outputs the resulting difference signal to TDAC coding section 307.

Low-pass filter 306 suppress frequency components higher than 7 kHz in the second lower band signal received as input from band split processing section 301, and provides and outputs a signal mainly comprised of frequency components equal to or lower than 7 kHz to TDAC coding section 307 and TDBWE (Time-Domain BandWidth Extension) coding section 308 as a filtered second lower band signal.

TDAC coding section 307 applies orthogonal transform such as MDCT to the difference signal received as input from adding section 305 and the filtered second lower band signal received as input from low-pass filter 306, and, among the resulting frequency domain signals (i.e. MDCT coefficients) of the 0 to 8 kHz band, outputs the 7 to 8 kHz band part to middle band correcting section 203 as middle band spectrum X_mid. Here, upon applying orthogonal transform to the difference signal received as input from adding section 305, TDAC coding section 307 weights the difference signal using perceptual weighting information, which is one of the CELP parameters received as input from CELP coding section 303, and then performs orthogonal transform to calculate frequency domain signals. Further, TDAC coding section 307 quantizes the frequency domain signals (i.e. MDCT coefficients) acquired by orthogonal transform such as MDCT, and outputs the resulting TDAC parameters to multiplexing section 309. Also, TDAC coding section 307 decodes the TDAC parameters and outputs the 0 to 7 kHz band part of the resulting decoded signal to middle/higher band encoding section 204 as decoded lower band spectrum S_lo.

TDBWE coding section 308 performs band extension coding of the filtered second lower band signal received as input from low-pass filter 306, on the time axis, and outputs the resulting TDBWE parameters to multiplexing section 309.

Multiplexing section 309 multiplexes the FEC parameters, CELP parameters, TDAC parameters and TDBWE parameters, and outputs the result to multiplexing section 205 as lower band encoded information. Here, it is equally possible to multiplex these parameters in multiplexing section 205, without providing multiplexing section 309.

Coding in lower band encoding section 202 according to the present embodiment shown in FIG. 3 differs from G.729.1 coding, not only in that TDAC coding section 307 applies orthogonal transform such as MDCT to a difference signal received as input from adding section 305 and filtered second lower band signal received as input from low-pass filter 306, but also in that TDAC coding section 307 outputs the 7 to 8 kHz band part of MDCT coefficients to middle band correcting section 203 as middle band spectrum X_mid and outputs the 0 to 7 kHz band part of a decoded signal acquired by decoding TDAC parameters to middle/higher band encoding section 204 as decoded lower band spectrum S_lo.

Next, processing in middle band correcting section 203 will be explained.

To explain the processing in middle band correcting section 203, first, the filter characteristics of low-pass filter 306 in lower band encoding section 202 will be explained.

Transfer function H(z) of low-pass filter 306 in lower band encoding section 202 is expressed by following equation 1, for example.

(Equation 1)

$$H(z)=\frac{0.3500277721+1.3045646694z^{-1}+1.9127698530z^{-2}+1.3045646694z^{-3}+0.3500277721^{-1}}{1+1.79857371201z^{-1}+1.69962113314z^{-2}+0.70669663302z^{-3}+0.16954708937z^{-4}} \quad [1]$$

Figure 4:
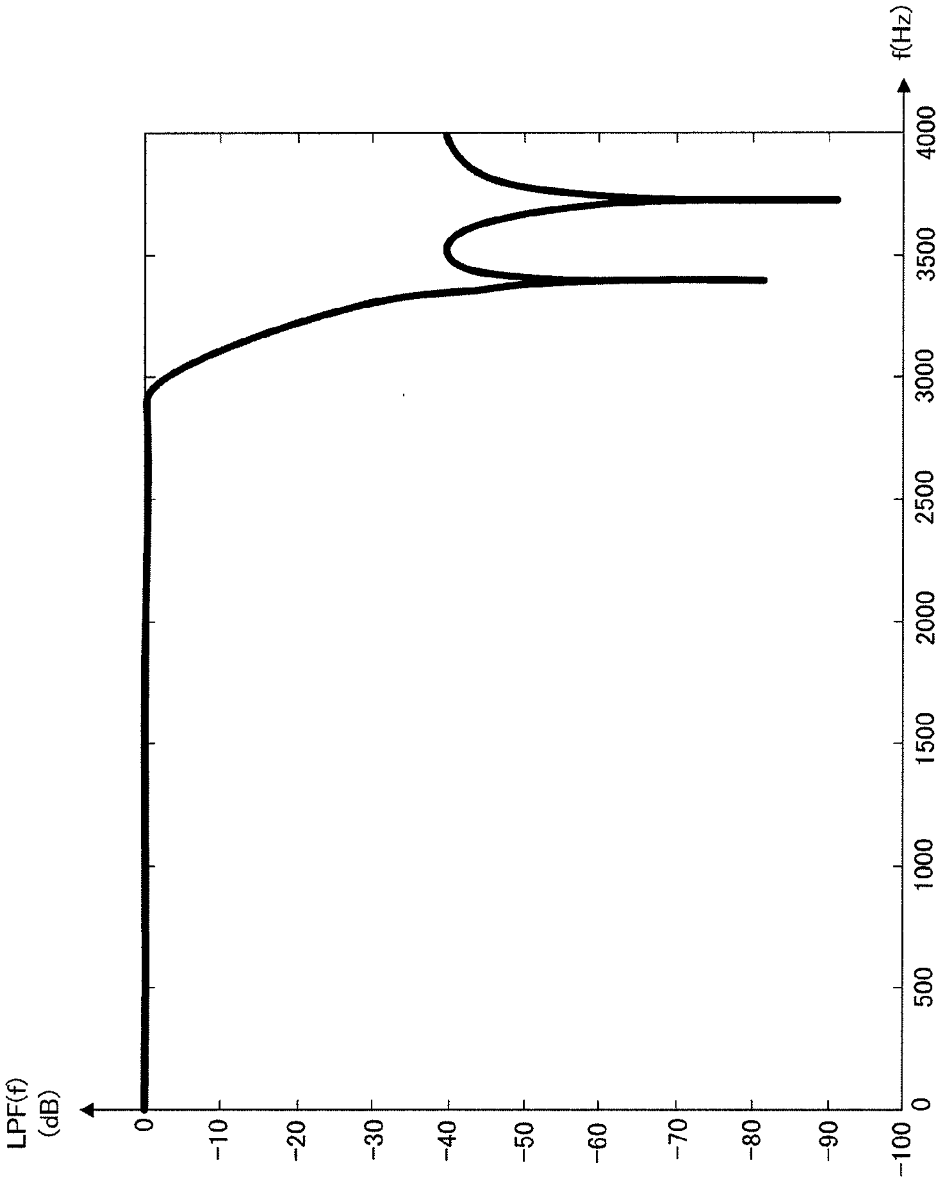
FIG. 4 shows frequency characteristics of a low-pass filter shown in FIG. 3.
Figure 5:
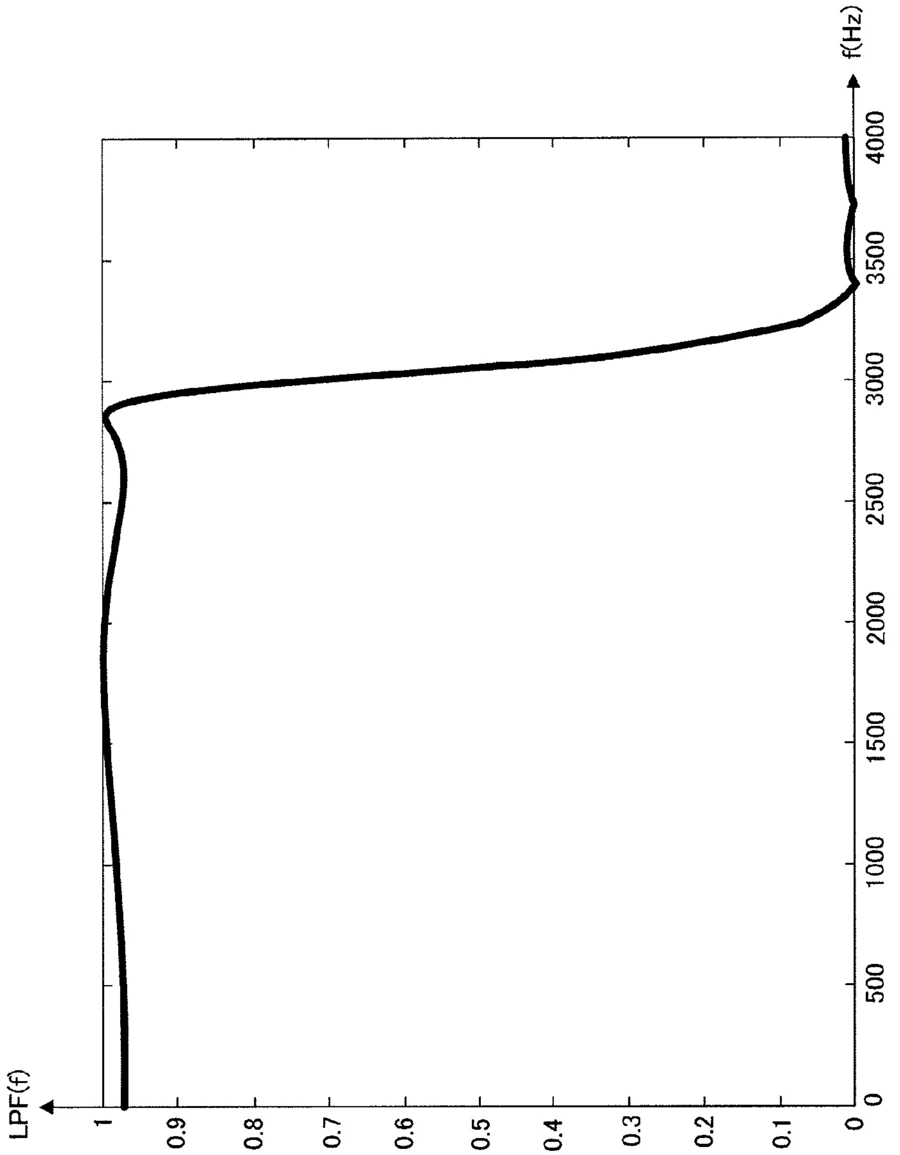
FIG. 5 shows frequency characteristics of a low-pass filter shown in FIG. 3.

FIG. 4 and FIG. 5 show the frequency characteristics of low-pass filter 306 having the transfer function expressed by equation 1. Although FIG. 4 and FIG. 5 show frequency characteristics in a case where low-pass filter 306 is applied to an input signal of the 0 to 4 kHz band, the band of a second lower band signal received as input in low-pass filter 306 is 4 to 8 kHz in the present embodiment. Consequently, in this case, the frequency characteristics of low-pass filter 306 shown in FIG. 4 and FIG. 5 actually apply in 4 to 8 kHz. In FIG. 4 and FIG. 5, the horizontal axis represents frequency f (Hz), and the vertical axis represents the value of LPF(f) showing a frequency characteristic of low-pass filter 306. Also, FIG. 4 shows frequency characteristics using log scale (dB), and FIG. 5 shows frequency characteristics using a linear scale, where the value of LPF(f) is 0 to 1 in this case. By filtering a second lower band signal (of 4 to 8 kHz) received as input from band split processing section 301, low-pass filter 306 having the frequency characteristics shown in FIG. 4 and FIG. 5 provides a filtered second lower band signal which is mainly comprised of frequency components of the 4 to 7 kHz band and in which frequency components of the 7 to 8 kHz band are suppressed. Next, the filtered second lower band signal is subjected to MDCT in TDAC coding section 307. Therefore, middle band spectrum X_mid received as input from TDAC coding section 307 to middle band correcting section 203 is the result of applying MDCT to the signal of the 7 to 8 kHz band suppressed by low-pass filter 306.

Middle band correcting section 203 corrects middle band spectrum X_mid received as input from lower band encoding section 202 on the frequency axis, using the frequency characteristics of low-pass filter 306 shown in FIG. 5, and calculates corrected middle band spectrum S_mid. To be more specific, by dividing middle band spectrum X_mid of the 7 to 8 kHz band by the value of LPF(f) of the 3 to 4 kHz band in low-pass filter 306 shown in FIG. 5 according to following equation 2, middle band correcting section 203 calculates corrected middle band spectrum S_mid. Here, the 3 to 4 kHz band of frequency characteristic LPF(f) in low-pass multiplying middle band spectrum X_mid by the reciprocal of the frequency characteristic of low-pass filter 306, middle band correcting section 203 provides MDCT coefficients for the 7 to 8 kHz band of a second lower band signal reconstructed to the state the before processing in low-pass filter 306.

(Equation 2)

$$\text{S\_mid}(k)=W(f)\cdot\frac{\text{X\_mid}(k)}{LPF(f)\cdot}\begin{pmatrix}k=0,\ \ldots\ ,N_{lo}-1\\ f=3000,\ \ldots\ ,4000\quad LPF(f)\neq 0\end{pmatrix} \quad [2]$$

In equation 2, LPF(f) represents a frequency characteristic (i.e. the value on the vertical axis) of the 3 to 4 kHz part shown in FIG. 5 and varies in the range from 0 to 1.0. Here, $N_{10}$ is the number of samples of frequency components in the 7 to 8 kHz band. Also, although f assumes values from 3000 to 4000 Hz in equation 2, this is applied to the 4 to 8 kHz band in a second lower band signal, and therefore f actually has frequencies from 7000 to 8000 kHz. Also, in equation 2, k has the frequency index value of middle band spectrum X_mid associated with the values of f from 3000 to 4000 Hz. That is, if f=3000, the value of LPF(3000) for the component of 7000 Hz in the second lower band signal is applied to the value of middle band spectrum X_mid(0), or, if f=4000, the value of LPF(4000) for the component of 8000 Hz in the second lower band signal is applied to middle band spectrum X_mid($N_{lo}$−1).

Also, W(f) represents the correction coefficients in equation 2 and has the function of suppressing abnormal sound that can occur in a case where a corrected middle band spectrum is calculated simply by dividing the middle band spectrum (of the 7 to 8 kHz band) by LPF(f). To be more specific, an experiment proves that an adequate value of W(f) is around 0.95 to 0.97. In the following, the effect of suppressing abnormal sound by W(f) will be explained.

Here, referring to the 0 to 1500 Hz band in FIG. 5, the frequency characteristic of low-pass filter 306 in the 0 to 1500 Hz band has values between 0.95 and 1.00. In this case, in the frequency characteristics of low-pass filter 306 shown in FIG.

5, the values from 0 to 1500 Hz are applied to the 4000 to 5500 Hz band of a second lower band signal. Therefore, the components of the 4000 to 5500 Hz band in the second lower band signal are approximately 0.95 to 0.97 times the signal before the processing in low-pass filter 306 is applied. That is, the 4000 to 5500 Hz band of a decoded lower band spectrum received as input from TDAC coding section 307 to middle/higher band encoding section 204 represents MDCT coefficients for a signal approximately 0.95 times the second lower band signal before the processing in low-pass filter 306 is applied. By contrast with this, the spectrum of the 7 to 8 kHz band acquired by multiplying middle band spectrum X_mid(k) by the reciprocal of the frequency characteristic of low-pass filter 306 instead of W(f) in equation 2, represents MDCT coefficients for the second lower band signal itself before the processing in low-pass filter 306. Middle band correcting section 203 outputs corrected middle band spectrum S_mid(k) calculated according to equation 2, to middle/higher band encoding section 204. Consequently, if W(f) is not multiplied in equation 2, the balance of spectral magnitude collapses between the 4000 to 5500 Hz band and the 7 to 8 kHz band in a spectrum received as input in middle/higher band encoding section 204, which causes abnormal sound.

Also, the accuracy of calculation in a calculator is not unlimited, and, if the value of LPF(f) is extremely low, the value of the reciprocal of LPF(f) is extremely high, which causes calculation error such as rounding error.

To solve such a problem, middle band correcting section 203 divides middle band spectrum X_mid(k) by the frequency characteristic of low-pass filter 306, and further multiplies the result by correction coefficient W(f) taking into account the values from 0 to 3000 Hz in low-pass filter 306. By this means, it is possible to maintain balance with the 4000 to 5500 Hz band, and further suppress the sound degradation due to calculation error and correct a spectrum in the 7 to 8 kHz band. The above processing for suppressing abnormal sound due to the distortion (such as discontinuity) of energy balance with adjacent bands, does not refer to simple inverse filtering processing in signal processing, but refers to a specific quality improvement technique for speech and audio signals.

Here, middle band correcting section 203 internally stores in advance LPF(f) (f=0, . . . , 4000) representing the frequency characteristics of low-pass filter 306 and W(f) for LPF(f). Here, it is equally possible to calculate in advance the values multiplying the reciprocals of LPF(f) by W(f) and store these values inside, so that a grater reduction in the amount of calculations is anticipated.

Figure 6:
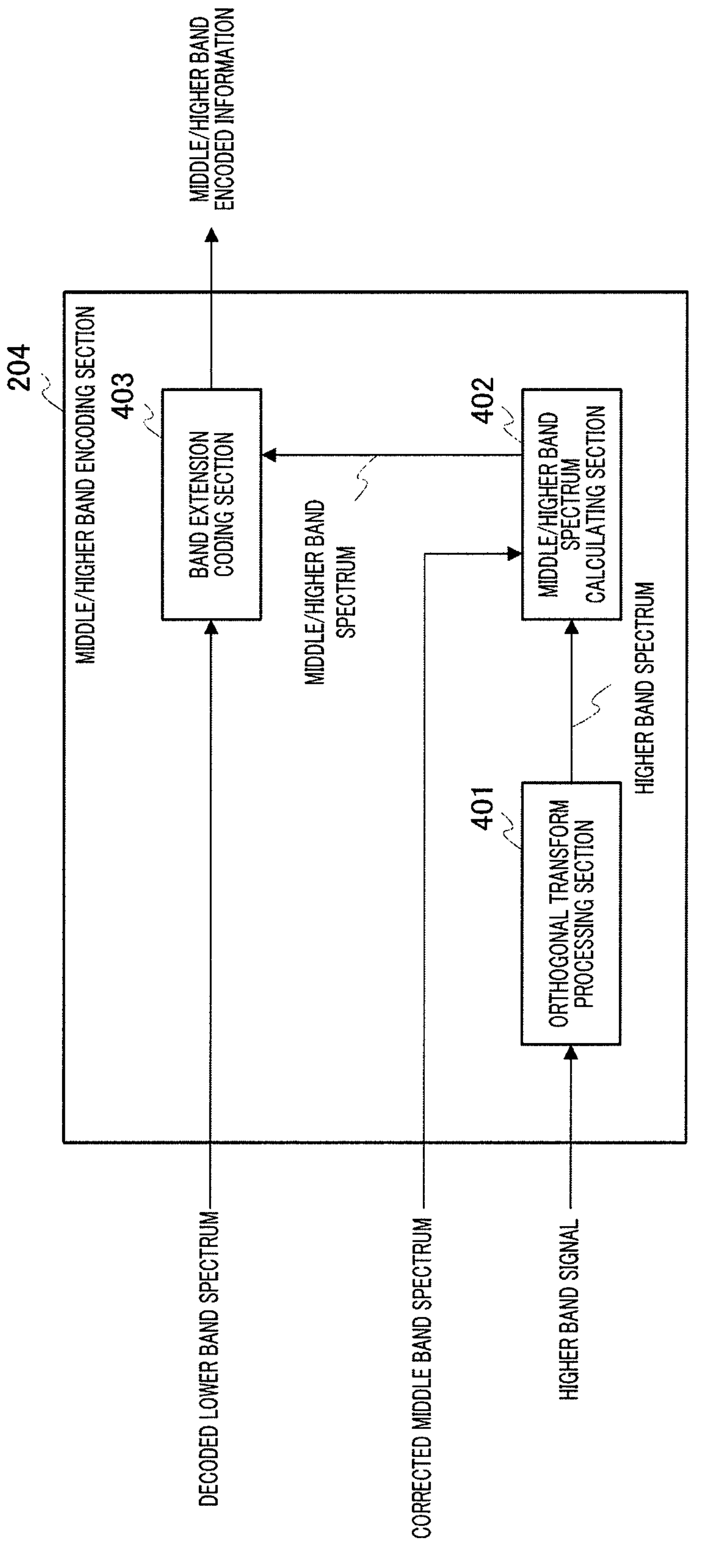
FIG. 6 is a block diagram showing the main configuration inside a middle/higher band encoding section shown in FIG. 2.

FIG. 6 is a block diagram showing the main configuration inside middle/higher band encoding section 204 shown in FIG. 2.

In FIG. 6, middle/higher band encoding section 204 is provided with orthogonal transform processing section 401, middle/higher band spectrum calculating section 402 and band extension coding section 403. These sections perform the following operations.

Orthogonal transform processing section 401 has built-in buffer $buf_n$ (n=0, . . . , N−1), performs orthogonal transform processing such as MDCT (Modified Discrete Cosine Transform) on higher band signal x_hi of the 8 to 16 kHz band received as input from band split processing section 201, and calculates higher band spectrum S_hi representing frequency components of higher band signal x_hi.

To be more specific, first, orthogonal transform processing section 401 initializes buffer $buf_n$ using "0," as shown in following equation 3.

(Equation 3)

$$buf_n=0\,(n=0, \ldots, N-1) \quad [3]$$

Next, orthogonal transform processing section 401 performs MDCT on higher band signal x_hi according to following equation 4, and calculates MDCT coefficients of the higher band signal, S_hi, as a higher band spectrum.

(Equation 4)

$$S\_hi(k) = \frac{2}{N}\sum_{n=0}^{2N-1} x\_hi'_n \cos\left[\frac{(2n+1+N)(2k+1)\pi}{4N}\right] \quad (k = 0, \ldots, N-1) \quad [4]$$

In equation 4, k represents the index of each sample in one frame. Here, x_hi' is the vector combining higher band signal x_hi and buffer $buf_n$ according to following equation 5.

(Equation 5)

$$x\_hi'_n = \begin{cases} buf_n & (n = 0, \ldots N-1) \\ x\_hi_{n-N} & (n = N, \ldots 2N-1) \end{cases} \quad [5]$$

Next, orthogonal transform processing section 401 updates buffer $buf_n$ as shown in following equation 6.

(Equation 6)

$$buf_n = x\_hi_n\,(n=0, \ldots N-1) \quad [6]$$

Further, orthogonal transform processing section 401 outputs higher band spectrum S_hi(k) to middle/higher band spectrum calculating section 402.

Middle/higher band spectrum calculating section 402 calculates middle/higher band spectrum S_mid_hi according to following equation 7, using higher band spectrum S_hi received as input from orthogonal transform processing section 401 and corrected middle band spectrum S_mid received as input from middle band correcting section 203, and outputs the result to band extension coding section 403. Here, the number of samples of S_mid_hi having components of the 7 to 16 kHz band is $N_{mid\_hi}$. That is, as shown in equation 7, middle/higher band spectrum S_mid_hi is the spectrum in which corrected middle band spectrum S_mid and higher band spectrum S_hi are connected (or combined) on the frequency axis.

(Equation 7)

$$S\_mid\_hi(k) = \begin{cases} S\_mid(k) & (k = 0, \ldots N_{lo}-1) \\ S\_hi(k-N_{lo}) & (k = N_{lo}, \ldots N_{mid\_hi}) \end{cases} \quad [7]$$

Using decoded lower band spectrum S_lo received as input from lower band encoding section 202 and middle/higher band spectrum S_mid_hi received as input from middle/higher band spectrum calculating section 402, band extension coding section 403 finds middle/higher band encoded information for generating the middle/higher band spectrum from the decoded lower band spectrum, and outputs this information to multiplexing section 205.

Figure 7:
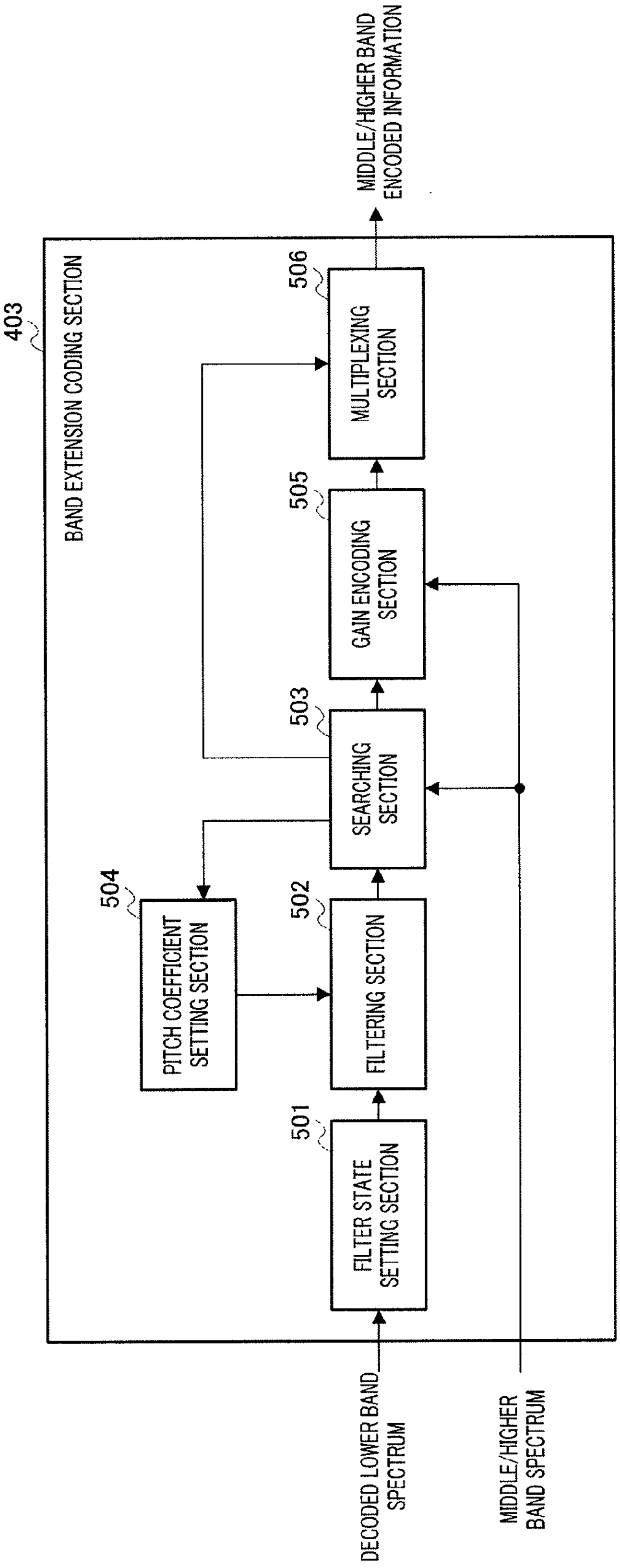
FIG. 7 is a block diagram showing the main configuration inside a band extension coding section shown in FIG. 6.

FIG. 7 is a block diagram showing the main configuration inside band extension coding section 403 shown in FIG. 6.

In FIG. 7, band extension coding section 403 is provided with filter state setting section 501, filtering section 502, searching section 503, pitch coefficient setting section 504, gain encoding section 505 and multiplexing section 506. These sections perform the following operations.

Filter state setting section 501 sets decoded lower band spectrum S_lo received as input from lower band encoding section 202, as a filter state to use in filtering section 502. That is, as the internal state (i.e. filter state), decoded lower band spectrum S_lo is stored in the 0 to 7 kHz band of spectrum S(k) ($0 \leqq k < 16$ kHz) of the whole frequency band (i.e. 0 to 16 kHz band) in filtering section 502.

Filtering section 502 has a pitch filter of multi-tap (i.e. the number of taps is greater than 1), filters decoded lower band spectrum S_lo based on the filter state set in filter state setting section 501 and pitch coefficients received as input from pitch coefficient setting section 504, and calculates the estimated value of middle/higher band spectrum, S_mid_hi' (in the 7 to 16 kHz band) (hereinafter referred to as "estimated middle/higher band spectrum"). Further, filtering section 502 outputs estimated middle/higher band spectrum S_mid_hi' to searching section 503.

Filtering processing in filtering section 502 will be described in more detail later.

Searching section 503 calculates the similarity between middle/higher band spectrum S_mid_hi (in the 7 to 16 kHz band) received as input from middle/higher band spectrum calculating section 402 and estimated middle/higher band spectrum S_mid_hi' received as input from filtering section 502. This similarity is calculated by correlation calculation, for example. Processing in filtering section 502, processing in searching section 503 and processing in pitch coefficient setting section 504 form a closed loop. In this closed loop, searching section 503 calculates the similarity for each pitch coefficient by variously changing pitch coefficient T received as input from pitch coefficient setting section 504 to filtering section 502. Of these calculated similarities, searching section 503 outputs optimal pitch coefficient T' to maximize the similarity, to multiplexing section 506. Further, searching section 503 outputs estimated middle/higher band spectrum S_mid_hi' for this pitch coefficient T' to gain encoding section 505. Search processing of optimal pitch coefficient T' in searching section 503 will be described in more detail later.

Pitch coefficient setting section 504 changes pitch coefficient T little by little in the search range from $T_{min}$ to $T_{max}$ under the control of searching section 503, and sequentially outputs pitch coefficient T to filtering section 502.

Gain encoding section 505 finds gain information of middle/higher band spectrum S_mid_hi(k) (in the 7 to 16 kHz band) received as input from middle/higher band spectrum calculating section 402. To be more specific, gain encoding section 505 splits the 7 to 16 kHz band into J subbands and calculates spectral power per subband of middle/higher band spectrum S_mid_hi(k). In this case, spectral power B(j) of the j-th subband is represented by following equation 8.

(Equation 8)

$$B(j) = \sum_{k=BL(j)}^{BH(j)} \text{S\_mid\_hi}(k)^2 \quad (j = 0, \ldots, J-1) \qquad [8]$$

In equation 8, BL(j) represents the lowest frequency in the j-th subband and BH(j) represents the highest frequency in the j-th subband.

Further, similarly, gain encoding section 505 calculates spectral power B'(j) per subband of estimated middle/higher band spectrum S_mid_hi' associated with optimal pitch coefficient T', according to following equation 9.

(Equation 9)

$$B'(j) = \sum_{k=BL(j)}^{BH(j)} \text{S\_mid\_hi}'(k)^2 \quad (j = 0, \ldots, J-1) \qquad [9]$$

Next, gain encoding section 505 calculates variation V(j) of spectral power per subband of estimated middle/higher band spectrum S_mid_hi' for middle/higher band spectrum S_mid_hi, according to following equation 10.

(Equation 10)

$$V(j) = \sqrt{\frac{B(j)}{B'(j)}} \quad (j = 0, \ldots, J-1) \qquad [10]$$

Further, gain encoding section 505 encodes variation V(j) and outputs the index associated with encoded variation $V_q(j)$ to multiplexing section 506.

Multiplexing section 506 multiplexes optimal pitch coefficient T' received as input from searching section 503 and the index of encoded variation $V_q(j)$ received as input from gain encoding section 505, and outputs the result to multiplexing section 205 as higher band encoded information. Here, it is equally possible to directly input T' and the index of $V_q(j)$ in multiplexing section 205 and multiplex them with lower band encoded information in multiplexing section 205.

Figure 8:
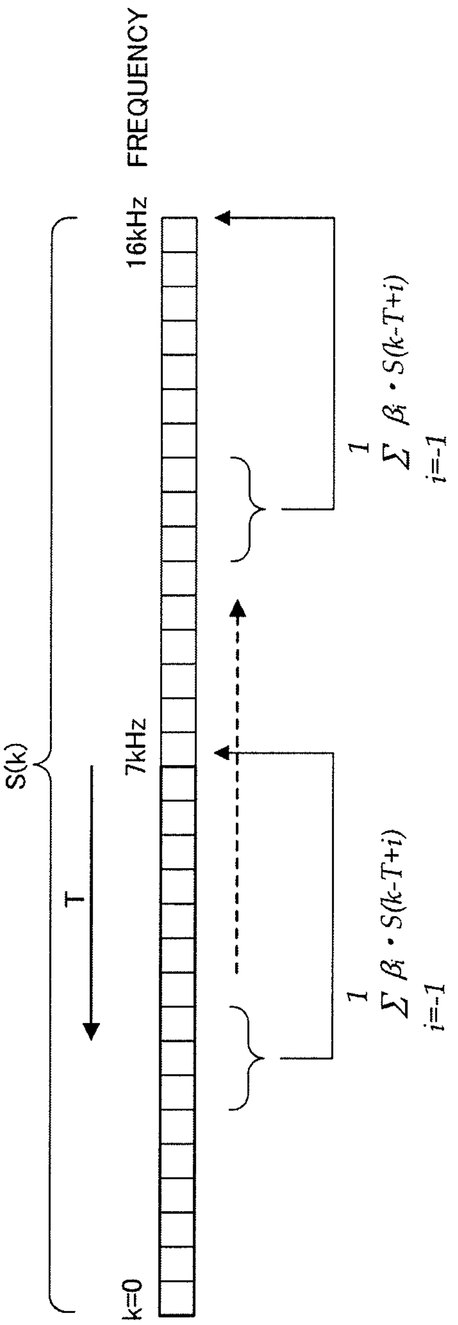
FIG. 8 specifically illustrates filtering processing in a filtering section shown in FIG. 7.

FIG. 8 specifically illustrates filtering processing in filtering section 502 shown in FIG. 7.

Filtering section 502 generates the spectrum of the 7 to 16 kHz band using pitch coefficient T received as input from pitch coefficient setting section 504. The transfer function in filtering section 502 is represented by following equation 11.

(Equation 11)

$$P(z) = \frac{1}{1 - \sum_{i=-M}^{M} \beta_i z^{-T+i}} \qquad [11]$$

In equation 11, T represents the pitch coefficients given from pitch coefficient setting section 504, and $\beta_i$ represents the filter coefficients stored inside in advance. For example, when the number of taps is three, the filter coefficient candidates are $(\beta_{-1}, \beta_0, \beta_1) = (0.1, 0.8, 0.2)$. In addition, the values $(\beta_{-1}, \beta_0, \beta_1) = (0.2, 0.6, 0.2)$ or (0.3, 0.4, 0.3) are possible. Also, M is 1 in equation 11. Further, M represents an index related to the number of taps.

The 0 to 7 kHz band in spectrum S(k) of the entire frequency band in filtering section 502 stores decoded lower band spectrum S_lo as the internal state of the filter (i.e. filter state).

The 7 to 16 kHz band of S(k) stores estimated middle/higher band spectrum S_mid_hi' by filtering processing of the following steps. That is, spectrum S(k−T) of a frequency that is lower than k by T, is basically assigned to S_mid_hi'. Here, to improve the smoothing level of the spectrum, in fact, it is necessary to calculate spectrum $\beta_i \cdot S(k-T+i)$ by multiplying predetermined filter coefficient $\beta_i$ by nearby spectrum S(k−T+i) separated from spectrum S(k−T) by i, calculate a spectrum by adding spectrums S(k−T+i) with respect to all i's, and assign the resulting spectrum to S_mid_hi'(k). This processing is represented by following equation 12.

(Equation 12)

$$S\_mid\_hi'(k) = \sum_{i=-1}^{1} \beta_i \cdot S(k - T + i) \quad [12]$$

By performing the above calculation by changing frequency k in the range of the 7 to 16 kHz band in order from lowest frequency k=7, estimated middle/higher band spectrum S_mid_hi'(k) in the 7 to 16 kHz is calculated.

The above filtering processing is performed by zero-clearing S(k) in the range of the 7 to 16 kHz band every time pitch coefficient T is given from pitch coefficient setting section 504. That is, S(k) is calculated and outputted to searching section 503 every time pitch coefficient T changes.

Figure 9:
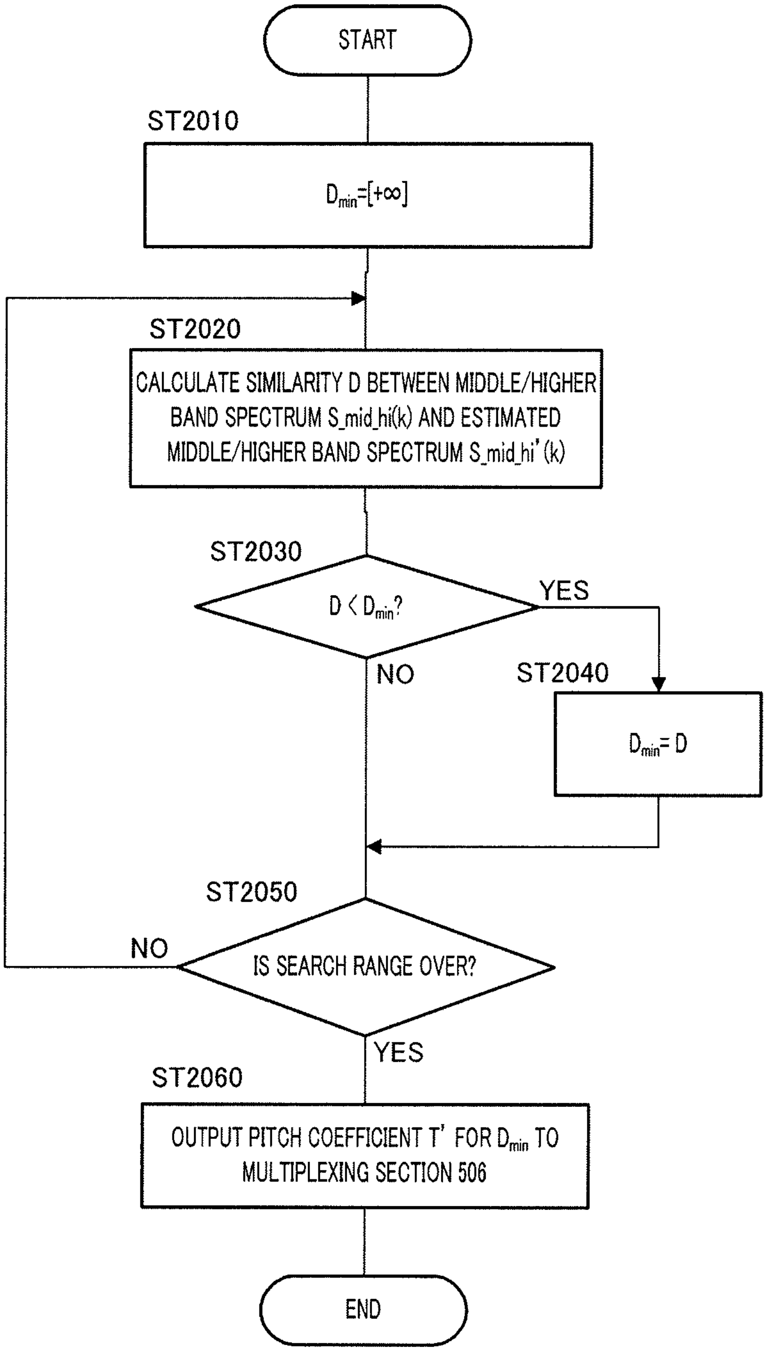
FIG. 9 is a flowchart showing the steps in the process of searching for an optimum pitch coefficient in a searching section shown in FIG. 7.

FIG. 9 is a flowchart showing the steps in the process of searching for optimal pitch coefficient T' in searching section 503.

First, searching section 503 initializes minimum similarity $D_{min}$, which is a variable value for storing the minimum similarity value, to [+∞] (ST 2010). Next, according to following equation 13, searching section 503 calculates similarity D between middle/higher band spectrum S_mid_hi at a given pitch coefficient and estimated middle/higher band spectrum S_mid_hi' (ST 2020).

(Equation 13)

$$D = \sum_{k=0}^{M'} S\_mid\_hi(k) \cdot S\_mid\_hi(k) - \frac{\left(\sum_{k=0}^{M'} S\_mid\_hi(k) \cdot S\_mid\_hi'(k)\right)^2}{\sum_{k=0}^{M'} S\_mid\_hi'(k) \cdot S\_mid\_hi'(k)} \quad [13]$$

In equation 13, M' represents the number of samples upon calculating similarity D, and adopts an arbitrary value equal to or less than sample length $N_{mid\_hi}$ in the middle/higher band.

Also, as described above, estimated middle/higher band spectrum S_mid_hi' generated in filtering section 502 is the spectrum acquired by filtering decoded lower band spectrum S_lo. Therefore, the similarity between middle/higher band spectrum S_mid_hi and estimated middle/higher band spectrum S_mid_hi' calculated in searching section 503 may also represent the similarity between middle/higher band spectrum S_mid_hi and decoded lower band spectrum S_lo.

Next, searching section 503 decides whether or not calculated similarity D is less than minimum similarity $D_{min}$ (ST 2030). If similarity D calculated in ST 2020 is less than minimum similarity $D_{min}$ ("YES" in ST 2030), searching section 503 assigns similarity D to minimum similarity $D_{min}$ (ST 2040). By contrast, if similarity D calculated in ST 2020 is equal to or greater than minimum similarity $D_{min}$ ("NO" in ST 2030), searching section 503 decides whether or not the search range is over. That is, with respect to all pitch coefficients in the search range, searching section 503 decides whether or not similarity D is calculated according to above equation 13 in ST 2020 (ST 2050). If the search range is not over ("NO" in ST 2050), the flow returns to ST 2020 again in searching section 503. Further, searching section 503 calculates the similarity according to equation 13, with respect to a different pitch coefficient from the pitch coefficient used when the similarity was previously calculated according to equation 13 in the step of ST 2020. By contrast, if the search range is over ("YES" in ST 2050), searching section 503 outputs pitch coefficient T associated with minimum similarity $D_{min}$ to multiplexing section 506 as optimal pitch coefficient T', and outputs estimated middle/higher band spectrum S_mid_hi' (k) associated with optimal pitch coefficient T' to gain encoding section 505 (ST 2060).

Figure 10:
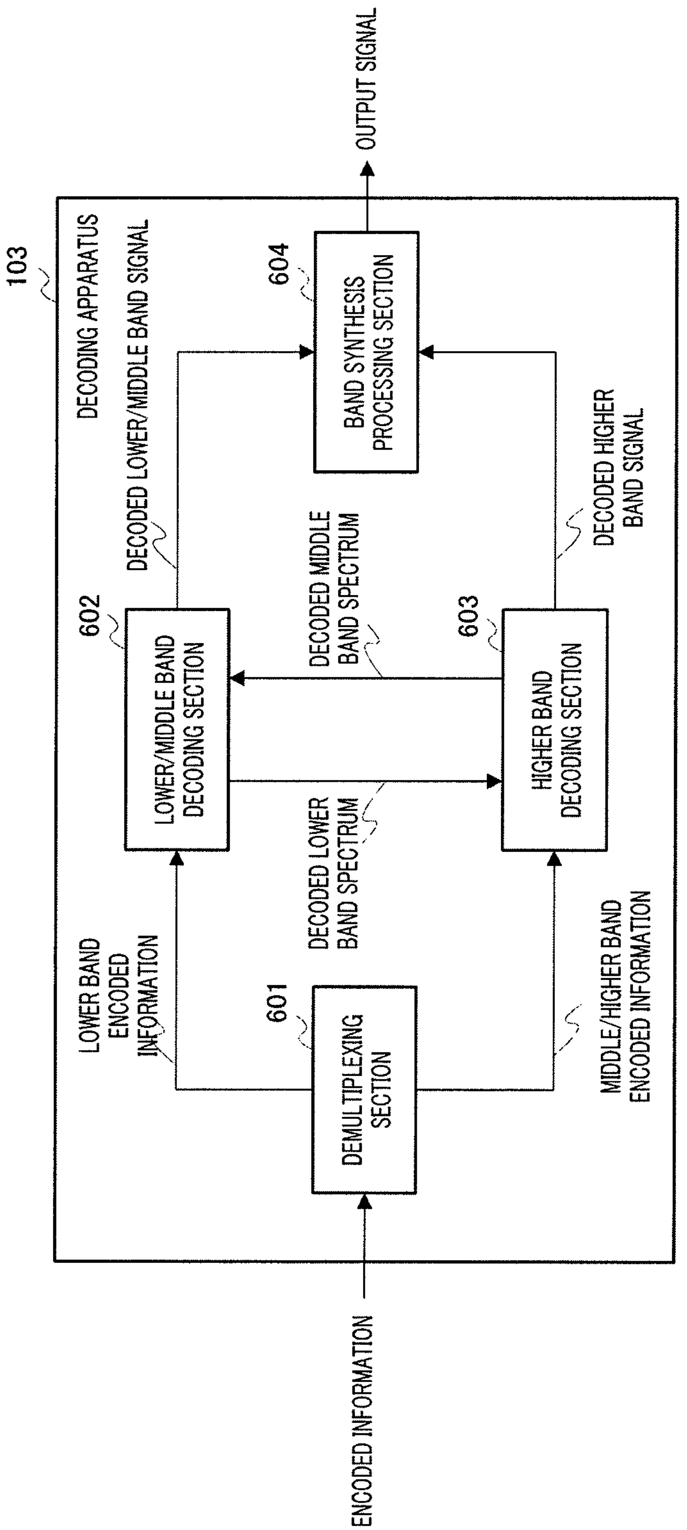
FIG. 10 is a block diagram showing the main configuration inside a decoding apparatus shown in FIG. 1.

FIG. 10 is a block diagram showing the main configuration inside decoding apparatus 103 shown in FIG. 1.

Decoding apparatus 103 is provided with demultiplexing section 601, lower/middle band decoding section 602, higher band decoding section 603 and band synthesis processing section 604. These sections perform the following operations.

Demultiplexing section 601 demultiplexes encoded information transmitted from encoding apparatus 101 via transmission channel 102, into the lower band encoded information and middle/higher band encoded information, outputs the lower band encoded information to lower/middle band decoding section 602 and outputs the middle/higher band encoded information to higher band decoding section 603.

Lower/middle band decoding section 602 decodes the lower band encoded information received as input from demultiplexing section 601 and outputs the resulting decoded lower band spectrum to higher band decoding section 603. Further, lower/middle band decoding section 602 generates a decoded lower/middle band signal from that decoded lower band spectrum and decoded middle band spectrum received as input from higher band decoding section 603, and outputs the result to band synthesis processing section 604. Lower/middle band decoding section 602 will be described in more detail later.

Higher band decoding section 603 generates a decoded higher band signal from the middle/higher band encoded information received as input from demultiplexing section 601 and decoded lower band spectrum received as input from lower/middle band decoding section 602, and outputs the result to band synthesis processing section 604. Also, higher band decoding section 603 outputs a decoded middle band spectrum calculated upon generating the decoded higher band signal, to lower/middle band decoding section 602. Higher band decoding section 603 will be described in more detail later.

Band synthesis processing section 604 receives as input the decoded lower/middle band signal from lower/middle band decoding section 602 and decoded higher band signal from higher band decoding section 603.

By performing opposite processing to that of band split processing section 201, band synthesis processing section 604 generates an output signal of 32 kHz sampling frequency (of the 0 to 16 kHz band) from the decoded lower/middle band signal of 16 kHz sampling frequency (of the 0 to 8 kHz band) received as input from lower/middle band decoding section 602 and decoded higher band signal (of the 8 to 16 kHz band) received as input from higher band decoding section 603, and outputs the result.

Figure 11:
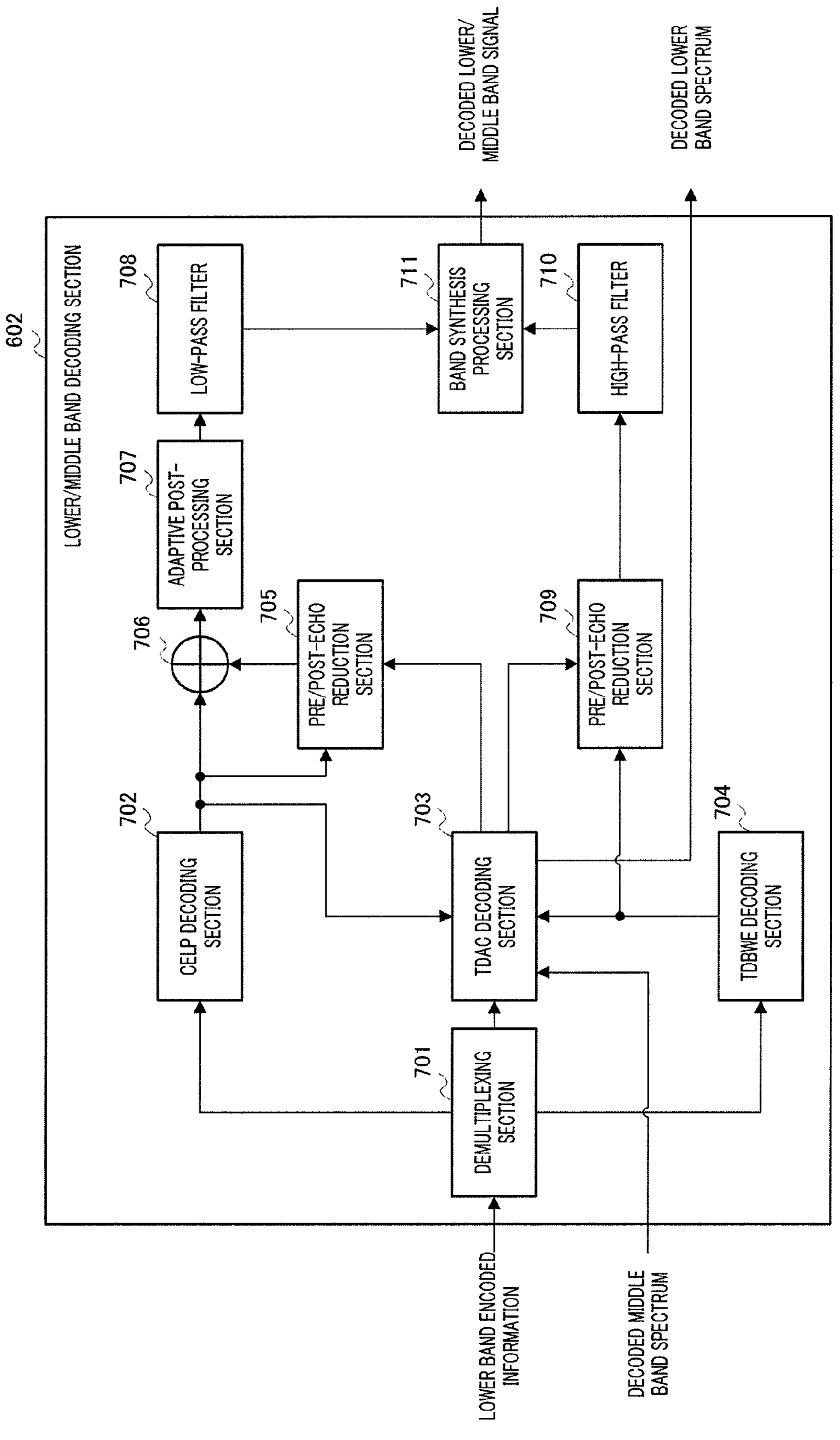
FIG. 11 is a block diagram showing the main configuration inside a lower/middle band decoding section shown in FIG. 10.

FIG. 11 is a block diagram showing the main configuration inside lower/middle band decoding section 602 shown in FIG. 10. Here, in association with lower band encoding section 202 of FIG. 2, an example case will be explained where lower/middle band decoding section 602 performs decoding according to ITU-T recommendation G.729.1 and so on. Also, the configuration of lower/middle band decoding section 602 shown in FIG. 11 represents a configuration in a case where frame errors do not occur, and therefore the structural components for frame error compensation processing will not be shown and their explanation will be omitted. However, the present invention is applicable to a case where frame errors occur.

Lower/middle band decoding section 602 is provided with demultiplexing section 701, CELP decoding section 702, TDAC decoding section 703, TDBWE decoding section 704, pre/post-echo reduction section 705, adding section 706, adaptive post-processing section 707, low-pass filter 708, pre/post-echo reduction section 709, high-pass filter 710 and band synthesis processing section 711. These sections perform the following operations.

Demultiplexing section 701 demultiplexes lower band encoded information received as input from demultiplexing section 601 into the CELP parameters, TDAC parameters and TDBWE parameters, and outputs the CELP parameters to CELP decoding section 702, the TDAC parameters to TDAC decoding section 703 and the TDBWE parameters to TDBWE decoding section 704. Also, it is equally possible to separate these parameters in demultiplexing section 601 together, without providing demultiplexing section 701.

CELP decoding section 702 performs CELP decoding of the CELP parameters received as input from demultiplexing section 701, and outputs the resulting decoded signal to TDAC decoding section 703, adding section 706 and pre/post-echo reduction section 705 as a decoded first lower band signal. Here, instead of the decoded first lower band signal, CELP decoding section 702 may output other information provided in the decoding process of generating the decoded first lower band signal from the CELP parameters, to TDAC decoding section 703.

Using the TDAC parameters received as input from demultiplexing section 701, decoded first lower band signal received as input from CELP decoding section 702 or other information which is provided upon generating the decoded first lower band signal and which is received as input from CELP decoding section 702, decoded TDBWE signal received as input from TDBWE decoding section 704 and decoded middle band spectrum of the 7 to 8 kHz band received as input from higher band decoding section 603, TDAC decoding section 703 calculates and outputs a decoded lower band spectrum to higher band decoding section 603. Also, TDAC decoding section 703 calculates a decoded lower/middle band spectrum of the 0 to 8 kHz band using a decoded middle band spectrum received as input from higher band decoding section 603. To be more specific, by using the values of the 0 to 7 kHz band in the decoded middle band spectrum to express the decoded lower band spectrum and using the values of the 7 to 8 kHz band in the decoded middle band spectrum to express the decoded lower/middle band spectrum, it is possible to calculate the decoded lower/middle band spectrum. Also, TDAC decoding section 703 applies orthogonal transform processing such as MDCT to the 0 to 4 kHz band and 4 to 8 kHz band of the calculated decoded lower/middle band spectrum, and calculates a decoded first TDAC signal (of the 0 to 4 kHz band) and decoded second TDAC signal (of the 4 to 8 kHz band). TDAC decoding section 703 outputs the calculated, decoded first TDAC signal to pre/post-echo reduction section 705 and outputs the calculated, decoded second TDAC signal to pre/post-echo reduction section 709.

TDBWE decoding section 704 decodes the TDBWE parameters received as input from demultiplexing section 701, and outputs the resulting decoded signal to TDAC decoding section 703 and pre/post-echo reduction section 709 as a decoded TDBWE signal.

Pre/post-echo reduction section 705 applies pre/post-echo reduction processing to the decoded CELP signal received as input from CELP decoding section 702 and the decoded first TDAC signal received as input from TDAC decoding section 703, and outputs the resulting signal without echo to adding section 706.

Adding section 706 adds the decoded CELP signal received as input from CELP decoding section 702 and the signal without echo received as input from pre/post-echo reduction section 705, and outputs the resulting addition signal to adaptive post-processing section 707.

Adaptive post-processing section 707 applies adaptive post-processing to the addition signal received as input from adding section 706, and outputs the resulting decoded first lower band signal (of the 0 to 4 kHz band) to low-pass filter 708.

Low-pass filter 708 suppress frequency components higher than 4 kHz in the decoded first lower band signal received as input from adaptive post-processing section 707, provides a signal mainly comprised of frequency components equal to or lower than 4 kHz, and outputs the signal to band synthesis processing section 711 as a filtered, decoded first lower band signal.

Pre/post-echo reduction section 709 applies pre/post-echo reduction processing to the decoded second TDAC signal received as input from TDAC decoding section 703 and decoded TDBWE signal received as input from TDBWE decoding section 704, and outputs the resulting signal without echo to high-pass filter 710 as a decoded second lower band signal (of the 4 to 8 kHz band).

High-pass filter 710 suppresses frequency components equal to or lower than 4 kHz in the decoded second lower band signal received as input from pre/post-echo reduction section 709, provides a signal mainly comprised of frequency components higher than 4 kHz, and outputs the signal to band synthesis processing section 711 as a filtered, decoded second lower band signal.

Band synthesis processing section 711 receives as input the filtered, decoded first lower band signal from low-pass filter 708 and the filtered, decoded second lower band signal from high-pass filter 710. By performing opposite processing to that of band split processing section 301, band synthesis processing section 711 generates a decoded lower/middle band signal of 16 kHz sampling frequency (of the 0 to 8 kHz band) from the filtered, decoded first lower band signal (of the 0 to 4 kHz band) of 8 kHz sampling frequency and the filtered, decoded second lower band signal (of the 4 to 8 kHz band), and outputs the result to band synthesis processing section 604.

Also, it is equally possible to perform band synthesis processing in band synthesis processing section 604 altogether, without providing band synthesis processing section 711.

Decoding in lower/middle band decoding section 602 according to the present embodiment shown in FIG. 11 differs from G.729.1 decoding in that TDAC decoding section 703 outputs a decoded lower band spectrum of the 0 to 7 kHz band to higher band decoding section 603 at the time this decoded lower band spectrum is calculated from TDAC parameters, and in that TDAC decoding section 703 finds a TDAC decoded signal by applying orthogonal transform to a decoded lower/middle band spectrum, which is comprised of the decoded lower band spectrum and a decoded middle band spectrum of the 7 to 8 kHz band received as input from higher band decoding section 603, instead of applying orthogonal transform only to the decoded lower band spectrum.

Figure 12:
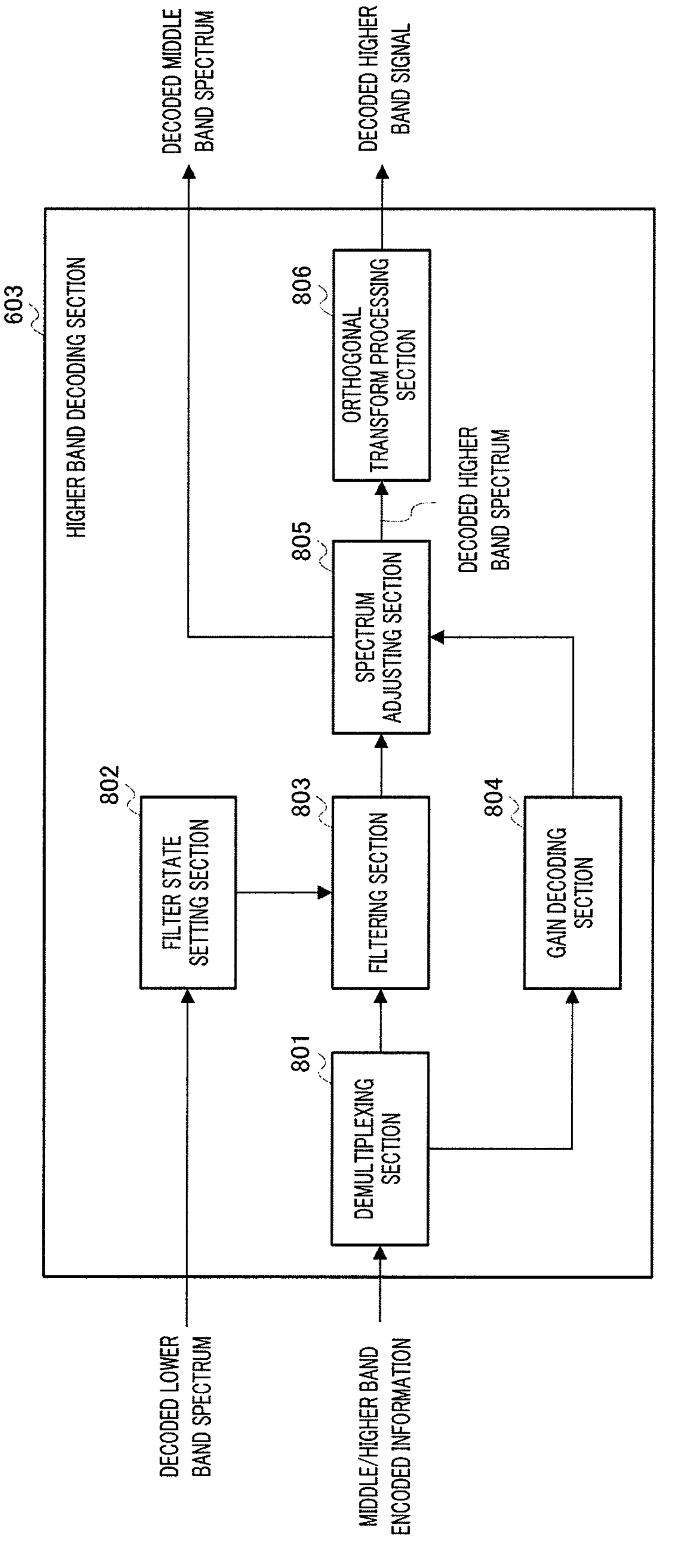
FIG. 12 is a block diagram showing the main configuration inside a higher band decoding section shown in FIG. 10.

FIG. 12 is a block diagram showing the main configuration inside higher band decoding section 603 shown in FIG. 10.

In FIG. 12, higher band decoding section 603 is provided with demultiplexing section 801, filter state setting section 802, filtering section 803, gain decoding section 804, spectrum adjusting section 805 and orthogonal transform section 806. These sections perform the following operations.

Demultiplexing section 801 demultiplexes middle/higher band encoded information received as input from demultiplexing section 601 into optimal pitch coefficient T' as filtering information and the index of encoded variation $V_q(j)$ as gain information, and outputs optimal pitch coefficient T' to filtering section 803 and the index of encoded variation $V_q(j)$ to gain decoding section 804. Here, if T' and the index of $V_q(j)$ has been separated in demultiplexing section 601, it is not necessary to provide demultiplexing section 801.

Filter state setting section 802 sets decoded lower band spectrum S_lo(k) (of the 0 to 7 kHz band) received as input from lower/middle band decoding section 602, as the filter state to use in filtering section 803. Here, in a case where the spectrum of the whole frequency band (i.e. the 0 to 16 kHz band) in filtering section 803 is referred to as S(k) for ease of explanation, decoded lower band spectrum S_lo(k) is stored in the 0 to 7 kHz band of S(k) as the internal state of the filter (i.e. filter state). Also, the configuration and operations of filter state setting section 802 are the same as filtering state setting section 501 shown in FIG. 7, and therefore detailed explanation will be omitted.

Filtering section 803 has a pitch filter of multi-tap (i.e. the number of taps is greater than 1). Also, filtering section 803 filters decoded lower band spectrum S_lo based on the filter state set in filter state setting section 802 and pitch coefficient T' received as input from demultiplexing section 801, and calculates estimated middle/higher band spectrum S_mid_hi' for middle/higher band spectrum S_mid_hi as shown in above equation 12. Even in filtering section 803, the transfer function shown in above equation 11 is used.

Gain decoding section 804 decodes the index of encoded variation $V_q(j)$ received as input from demultiplexing section 801, and finds variation $V_q(j)$ which is the quantization value of variation V(j).

According to following equation 14, spectrum adjusting section 805 multiplies estimated middle/higher band spectrum S_mid_hi' received as input from filtering section 803 by variation $V_q(j)$ per subband received as input from gain decoding section 804. By this means, spectrum adjusting section 805 adjusts the spectral shape in the 7 to 8 kHz band of estimated middle/higher band spectrum S_mid_hi', and generates decoded middle/higher band spectrum S_mid_hi2(*k*).

(Equation 14)

$$S\_mid\_hi2(k)=S\_mid\_hi'(k)\cdot V_q(j),(BL(j)\leq k\leq BH(j),\ \text{for all}\ j) \quad [14]$$

Further, spectrum adjusting section 805 forms decoded spectrum S2(*k*), using decoded lower band spectrum S_lo(k) as the lower band part (of 0 to 7 kHz) and decoded middle/higher band spectrum S_mid_hi2(*k*) as the middle/higher band part (of 7 to 16 kHz).

Also, spectrum adjusting section 805 outputs only the spectrum of the middle band part (i.e. the 7 to 8 kHz band) of decoded spectrum S2(*k*) to lower/middle band decoding section 602 as decoded middle band spectrum S_mid2(*k*), and outputs only the spectrum of the higher band (i.e. the 8 to 16 kHz band) of decoded spectrum S2(*k*) to orthogonal transform processing section 806 as decoded higher band spectrum S_hi2(*k*).

Orthogonal transform processing section 806 generates a time domain signal by performing orthogonal transform processing such as IMDCT (Inverse Modified Discrete Cosine Transform) on decoded higher band spectrum S_hi2 received as input from spectrum adjusting section 805, and outputs the signal as a decoded higher band signal. Here, processing such as suitable windowing and overlapping addition is performed if necessary, to prevent the discontinuity which occurs between frames.

Specific processing in orthogonal transform processing section 806 will be explained below.

Orthogonal transform processing section 806 has buffer buf'(k) inside, and initializes buffer buf'(k) as shown in following equation 15.

(Equation 15)

$$buf'(k)=0\ (k=0,\ldots,N-1) \quad [15]$$

Also, orthogonal transform processing section 806 calculates and outputs decoded higher band signal y" according to following equation 16, using decoded higher band spectrum S_hi2 received as input from spectrum adjusting section 805.

(Equation 16)

$$y''_n = \frac{2}{N}\sum_{n=0}^{2N-1} Z(k)\cos\left[\frac{(2n+1+N)(2k+1)\pi}{4N}\right] \quad (n=0,\ldots,N-1) \quad [16]$$

In equation 16, Z(k) is the vector combining decoded higher band spectrum S_hi2(*k*) and buffer buf'(k), as shown in following equation 17.

(Equation 17)

$$Z(k)=\begin{cases} buf'(k) & (k=0,\ldots N-1) \\ S\_hi2(k) & (k=N,\ldots 2N-1) \end{cases} \quad [17]$$

Next, orthogonal transform processing section 806 updates buffer buf'(k) according to following equation 18.

(Equation 18)

$$buf'(k)=S\_hi2(k)\ (k=0,\ldots N-1) \quad [18]$$

As described above, in encoding apparatus 101 according to the present embodiment, after an input signal is split into the lower/middle band signal and the higher band signal in band split processing section 201, middle band correcting section 203 applies characteristics inverse to the filter characteristics of low-pass filter 306 or similar characteristics to the inverse characteristics, to middle band frequency components suppressed in processing of low-pass filter 306 in lower band encoding section 202, thereby reconstructing the middle band frequency components in a state equivalent to a state in which low-pass filter 306 is not applied. Next, middle/higher band encoding section 204 finds band extension parameters for generating frequency components between the lower band and the middle band, using the reconstructed middle band frequency components. Also, decoding apparatus 103 according to the present embodiment finds a decoded middle/higher band spectrum from a decoded lower band spectrum provided in lower/middle band decoding section 602 and the band extension parameters transmitted from encoding apparatus 101. Lower/middle band decoding section 602 finds a decoded lower/middle band signal having lower/middle band frequency components, using a decoded middle band spectrum received as input from higher band decoding section 603 and lower band encoded information received as input from demultiplexing section 601. Next, band synthesis processing section 604 performs band synthesis processing of a decoded higher band signal found from a decoded higher band spectrum in higher band decoding section 603 and the above decoded lower/middle band signal, so that it is possible to provide an output signal (decoded signal) including middle band frequency components lost by low-pass filter 306 in lower band encoding section 202.

Thus, according to the present embodiment, the encoding apparatus splits the band of an input signal into the lower band component and the higher band component by QMF and so on, encodes these components in separate encoding sections, and, using MDCT coefficients provided by TDAC coding of lower band coding, reconstructs and encodes a band component lost by adopting a low-pass filter in the lower band coding process. Therefore, it is possible to suppress the amount of calculations required for that reconstruction and improve the quality of decoded signals.

Also, middle band correction processing in the present embodiment has little influence on the coding performance of an encoding method used in a lower band encoding section (i.e. G.729.1 coding in the present embodiment), so that it is possible to secure coding performance of lower band coding.

Also, although an example case has been described above with the present embodiment where lower band encoding section 202 and lower/middle band decoding section 602 perform CELP (such as G.729.1) speech coding and decoding, the present invention is not limited to this, and lower band encoding section 202 and lower/middle band decoding section 602 can equally perform coding or decoding of a lower band signal by speech/audio coding schemes other than CELP.

Also, although an example case has been described above with the present embodiment where middle band correcting section 203 finds and stores in advance the characteristics of low-pass filter 306, the present invention is not limited to this, and middle band correcting section 203 can equally find and use the characteristics of low-pass filter 306 every time these characteristics change. Also, in a case of finding and storing in advance the characteristics of low-pass filter 306, it is possible to reduce the amount of calculations by storing the reciprocals of the characteristics of low-pass filter 306 as a built-in table and multiplying the middle band spectrum by coefficients in the table.

Also, although an example case has been described above with the present embodiment where QMF is used as a band split method in band split processing section 201, the present invention is not limited to this, and it is equally possible to use other band split methods than QMF in band split processing section 201.

Also, although a method of finding the filter characteristics of low-pass filter 306 is not specifically limited in the present embodiment, it is desirable to find the filter characteristics using a similar method to the orthogonal transform method used in TDAC coding section 307. Therefore, in the configuration according to the present embodiment, it is suitable to find the filter characteristics of low-pass filter 306 using MDCT processing. Also, for example, in a case where frequency components are found by FFT processing in lower band encoding section 202, similarly, it is suitable to find the filter characteristics of low-pass filter 306 by FFT processing.

Also, an example case has been described above with the present embodiment where, when band extension coding section 403 finds middle/higher band encoded information, processing for distinguishing between the middle band and the higher band is not specifically performed for a middle/higher band spectrum including a corrected middle band spectrum. However, the present invention is not limited to this and is equally applicable to a case where a correction result is decided in the middle band part of a middle/higher band spectrum and coding processing is performed based on the decision result.

For example, an example case will be explained where middle/higher band spectrum calculating section 402 calculates an SFM (Spectral Flatness Measure) of a corrected middle band spectrum, compares the calculated SFM value and a predetermined threshold, and, based on this comparison result, performs correction processing on the corrected middle band spectrum. Here, SFM is represented by the ratio between the geometric mean and arithmetic mean (=geometric mean/arithmetic mean) of an amplitude spectrum. SFM approaches 0.0 when the peak level of a spectrum becomes higher or approaches 1.0 when the noise level of a spectrum becomes higher. In this case, first, middle/higher band spectrum calculating section 402 compares the SFM of the corrected middle band spectrum and predetermined threshold. If the SFM is less than the threshold, it can be decided that the corrected middle band spectrum varies significantly. In this case, middle/higher band spectrum calculating section 402 performs spectral smoothing (blunting) of the corrected middle band spectrum by a multi-tap filter, calculates a middle/higher band spectrum using the resulting corrected middle band spectrum, and outputs the middle/higher band spectrum to band extension coding section 403.

Band extension coding section 403 finds middle/higher band encoded information by the above-described method, using a corrected middle/higher band spectrum received as input from middle/higher band spectrum calculating section 402. With this configuration, in a case where the spectral characteristics of a middle band spectrum corrected in middle band correcting section 203 vary significantly on the spectrum and cause abnormal sound of decoded signals, it is possible to improve the quality of decoded signals by performing smoothing processing on the corrected middle band spectrum. Also, as for correction processing of a corrected middle band spectrum in middle/higher band spectrum calculating section 402, in addition to the above smoothing processing, it is equally possible to adopt the method of attenuating the corrected middle band spectrum on a per subband basis, the method of replacing the corrected middle band spectrum with a noise spectrum stored inside in advance, or the method of linearly predicting the corrected middle band spectrum from a lower band spectrum and higher band spectrum. Here, if the corrected middle band spectrum is linearly predicted from the lower band spectrum and higher band spectrum, middle/higher band spectrum calculating section 402 needs to receive as input a decoded lower band spectrum from lower band encoding section 202.

Also, to decide whether or not the above correction processing is performed on a corrected middle band spectrum, it is possible to use temporal energy variation of the corrected middle band spectrum in addition to the SFM of the corrected middle band spectrum. In this case, the energy of the corrected middle band spectrum is calculated on a per frame basis, and, if the variation to the energy of a past frame is equal to or greater than a predetermined threshold, the above correction processing (such as smoothing processing) is performed on the corrected middle band spectrum. With this configuration, even in a case where the temporal energy of a corrected middle band spectrum varies significantly and therefore causes abnormal sound of decoded signals, it is possible to provide decoded signals of good quality.

Also, as other switching methods of coding processing in band extension coding section 403, for example, the method of switching a weight upon search is possible in the middle band part of a middle/higher band spectrum as a reference. To be more specific, in searching section 503, it is possible to calculate the similarity according to equation 19, instead of equation 13.

(Equation 19)

$$D = \left\{ \sum_{k=0}^{M'} S\_mid\_hi(k) \cdot S\_mid\_hi(k) - \frac{\left( \sum_{k=0}^{M'} S\_mid\_hi(k) \cdot S\_mid\_hi'(k) \right)^2}{\sum_{k=0}^{M'} S\_mid\_hi'(k) \cdot S\_mid\_hi'(k)} \right\} \cdot W(k) \quad [19]$$

Here, in equation 19, W(k) represents the coefficients upon calculating the similarity. By adopting a predetermined value equal to or less than 1.0 when the value of k belongs to the middle band part (of 7 to 8 kHz) or a value of 1.0 when the value of k belongs to the higher band part, it is possible to reduce the proportion of the similarity of the corrected middle band spectrum part to the similarity of the whole middle/higher band spectrum, and, even in a case where the accuracy of the corrected middle band spectrum is poor, it is possible to suppress an occurrence of abnormal sound in decoded signals.

Also, it is possible to combine and use the above configurations of band extension coding section 403, middle/higher band spectrum calculating section 402 and lower band encoding section 202.

Also, although an example case has been described above with the present embodiment using scalable coding/decoding methods with two layers of the lower band encoding section (lower/middle band decoding section) and middle/higher band encoding section (higher band decoding section), the present invention is not limited to this and is equally applicable to scalable coding/decoding methods with three layers or more. Also, in scalable coding/decoding methods of three layers or more, if the configuration of the middle/higher band encoding section of the present invention is applied to a layer (e.g. layer L) other than the highest layer, by controlling layer (L+1) to preferentially encode an error spectrum of the middle band part, it is possible to improve the quality of decoded signals in layer (L+1).

Embodiment 2

The communication system according to Embodiment 2 of the present invention (not shown) is basically the same as the communication system shown in FIG. 1, and differs from decoding apparatus 103 of the communication system in FIG. 1 only in part of the configuration and operations of the decoding apparatus. In the following, the decoding apparatus in the communication system according to the present embodiment will be assigned the reference numeral “113” and explained.

Figure 13:
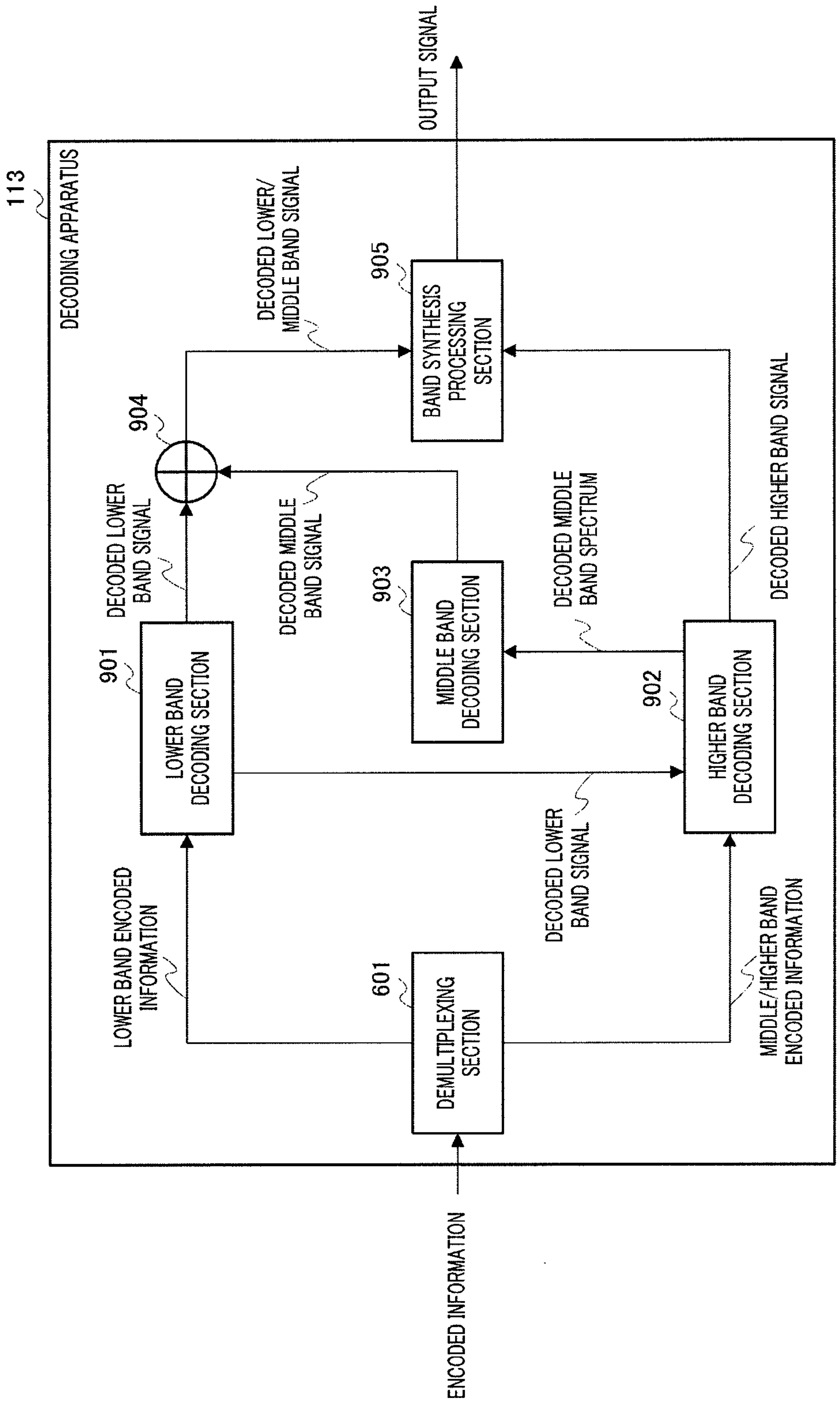
FIG. 13 is a block diagram showing the main configuration inside a decoding apparatus according to Embodiment 2 of the present invention.

FIG. 13 is a block diagram showing the main configuration inside decoding apparatus 113 according to the present embodiment. Also, decoding apparatus 113 according to the present embodiment has basically the same configuration and performs basically the same operations as decoding apparatus 103 shown in FIG. 10. Decoding apparatus 113 differs from decoding apparatus 103 in further having adding section 904 and middle band decoding section 903. Also, lower band decoding section 901, higher band decoding section 902 and band synthesis processing section 905 of decoding apparatus 113 differ from lower/middle band decoding section 602, higher band decoding section 603 and band synthesis processing section 604 of decoding apparatus 103 only in part of their operations.

Unlike lower/middle band decoding section 602 shown in FIG. 10, lower band decoding section 901 does not receive as input a decoded middle band spectrum from higher band decoding section 902, and decodes lower band encoded information received as input from demultiplexing section 601 to generate a decoded lower band spectrum and decoded lower band signal. Further, lower band decoding section 901 outputs the decoded lower band spectrum to higher band decoding section 902 and the decoded lower band signal to adding section 904. Lower band decoding section 901 will be described in more detail later.

Higher band decoding section 902 generates a decoded higher band signal from middle/higher band encoded information received as input from demultiplexing section 601 and the decoded lower band spectrum received as input from lower band decoding section 901, and outputs the decoded higher band signal to band synthesis processing section 905. Also, unlike higher band decoding section 603 shown in FIG. 10, higher band decoding section 902 outputs a decoded middle band spectrum calculated upon generating the decoded higher band signal, to middle band decoding section 903, instead of lower band decoding section 901.

Middle band decoding section 903 generates a decoded middle band signal by applying orthogonal transform processing such as IMDCT to the decoded middle band spectrum received as input from higher band decoding section 902, and outputs the decoded middle band signal to adding section 904. Also, IMDCT in middle band decoding section 903 is basically the same as IMDCT in orthogonal transform processing section 806 according to Embodiment 1 and differs from this IMDCT only in the processing target, and therefore detailed explanation will be omitted.

Adding section 904 adds the decoded lower band signal received as input from lower band decoding section 901 and the decoded middle band signal received as input from middle band decoding section 903, and outputs the resulting addition signal to band synthesis processing section 905 as a decoded lower/middle band signal.

Band synthesis processing section 905 receives as input the decoded middle band signal from adding section 904 and the decoded higher band signal from higher band decoding section 902. Further, by performing opposite processing to that of band split processing section 201, band synthesis processing section 905 generates an output signal of 32 kHz sampling frequency (of the 0 to 16 kHz band) from the decoded lower/middle band signal (of the 0 to 8 kHz band) of 16 kHz sampling frequency and decoded higher band signal (of the 8 to 16 kHz band), and outputs this output signal.

Figure 14:
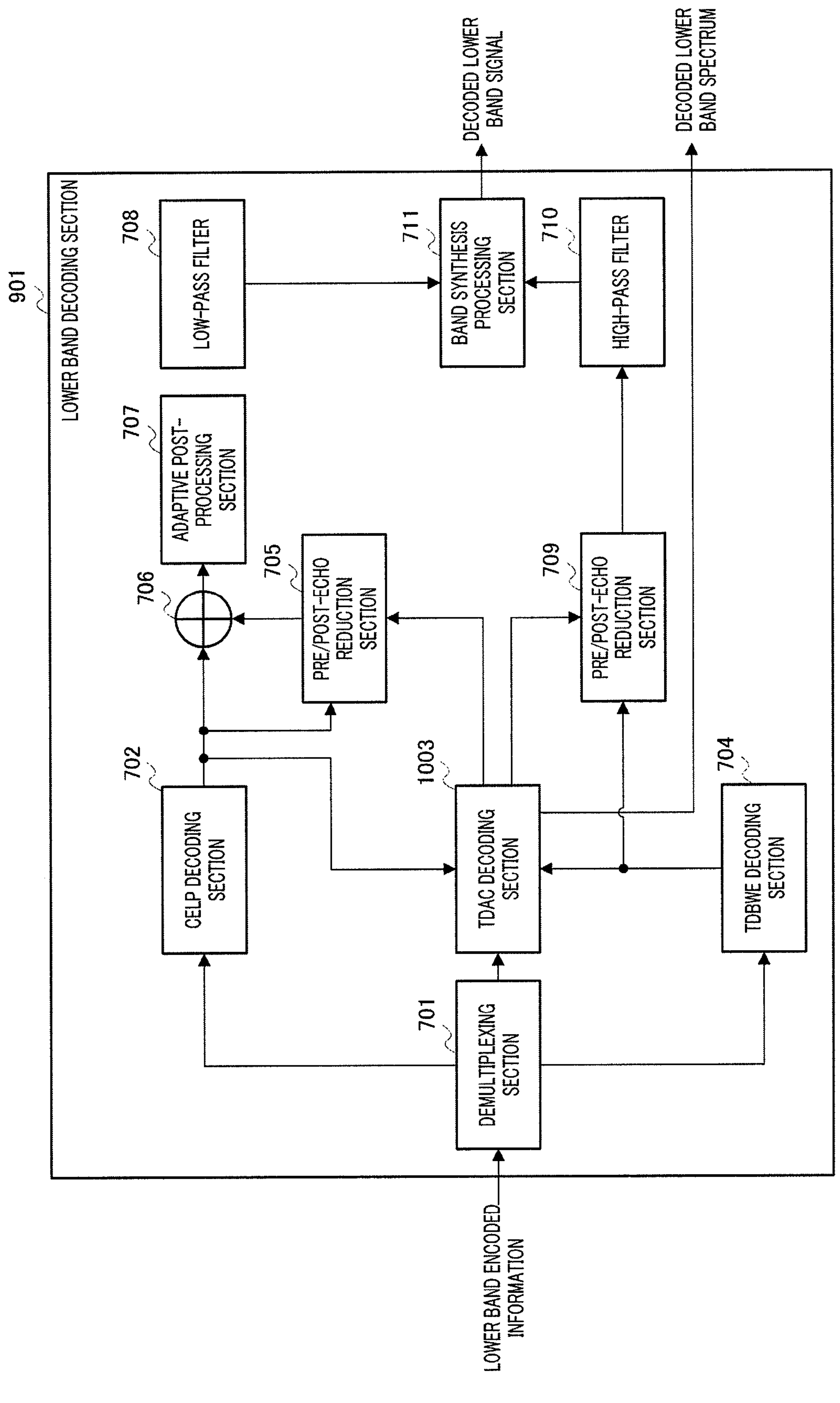
FIG. 14 is a block diagram showing the man components inside a lower band decoding section shown in FIG. 13.

FIG. 14 is a block diagram showing the main configuration inside lower band decoding section 901 shown in FIG. 13. Here, lower band decoding section 901 has basically the same configuration and performs basically the same operations as lower/middle band decoding section 602 shown in FIG. 11. TDAC decoding section 1003 of lower band decoding section 901 differs from TDAC decoding section 703 of lower/middle band decoding section 602 only in part of the operations.

Unlike TDAC decoding section 703 shown in FIG. 11, TDAC decoding section 1003 does not receive as input a decoded middle band spectrum of the 7 to 8 kHz band from higher band decoding section 902. Further, using TDAC parameters received as input from demultiplexing section 701, decoded first lower band signal received as input from CELP decoding section 702 or information which is provided upon generating the decoded first lower band signal and received as input from CELP decoding section 702, and decoded TDBWE signal received as input from TDBWE decoding section 704, TDAC decoding section 1003 calculates and outputs a decoded lower band spectrum to higher band decoding section 902. Also, TDAC decoding section 1003 applies individual orthogonal transform processing to the 0 to 4 kHz band and 4 to 7 kHz band of the calculated decoded lower band spectrum, and finds a decoded first TDAC signal (of the 0 to 4 kHz band) and decoded second TDAC signal (of the 4 to 7 kHz band). Further, TDAC decoding section 1003 outputs the decoded first TDAC signal to pre/post-echo reduction section 705 and the decoded second TDAC signal to pre/post-echo reduction section 709.

The decoded second TDAC signal received as input from TDAC decoding section 1003 to pre/post-echo reduction section 709 does not contain of the middle band (7 to 8 kHz) component, and therefore a signal received as input in band synthesis processing section 711 via pre/post-echo reduction section 709 and high-pass filter 710 does not contain the middle band component either. Accordingly, a signal to be outputted from band synthesis processing section 711 does not contain the middle band component either, and is therefore a decoded lower band signal, not a decoded lower/middle band signal.

Decoding in lower band decoding section 901 shown in FIG. 14 differs from G.729.1 decoding only in outputting a calculated decoded lower band spectrum to higher band decoding section 902, and, consequently, there are fewer differences between decoding in lower band decoding section 901 and G.729.1 decoding than between decoding in lower/middle band decoding section 602 shown in FIG. 11 and G.729.1 decoding.

Thus, according to the present embodiment, the encoding side splits the band of an input signal into the lower band component and the higher band component by QMF and so on, encodes these components in separate encoding sections, and reconstructs and encodes a band component lost by adopting a low-pass filter in the lower band coding process. Also, the decoding side decodes components of the above reconstructed band in a different decoding section from a decoding section that decodes the lower band component. Therefore, it is possible to use existing G.729.1 decoding with less correction, for decoding of the lower band component.

Embodiment 3

The communication system according to Embodiment 3 of the present invention (not shown) is basically the same as the communication system shown in FIG. 1, and differs from encoding apparatus 101 and decoding apparatus 103 of the communication system in FIG. 1 only in part of the configurations and operations of the encoding apparatus and decoding apparatus. In the following, the encoding apparatus and decoding apparatus of the communication system according to the present embodiment will be assigned the reference numerals “121” and “123” and explained.

Figure 15:
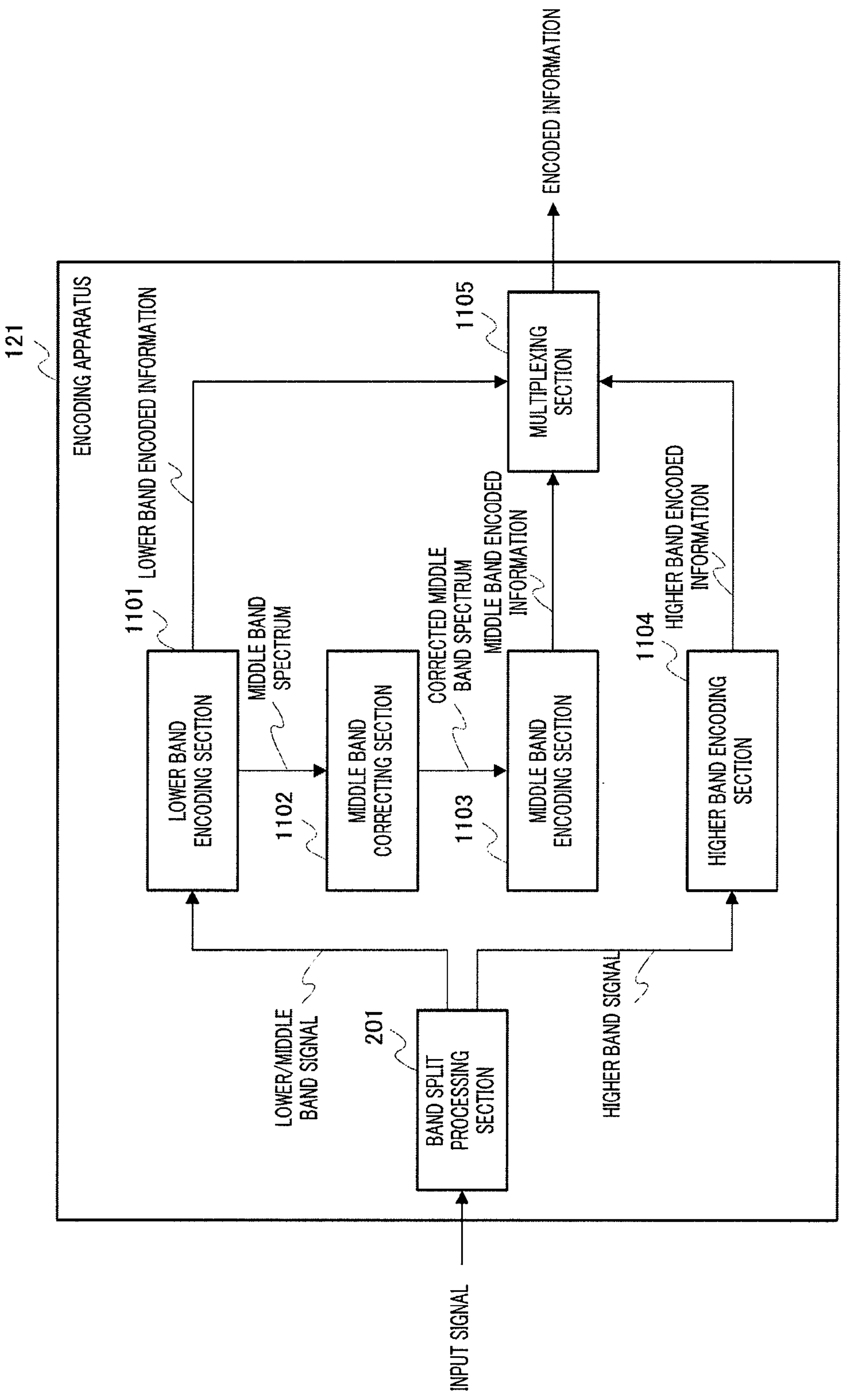
FIG. 15 is a block diagram showing the main configuration inside an encoding apparatus according to Embodiment 3 of the present invention.

FIG. 15 is a block diagram showing the main configuration inside encoding apparatus 121 according to the present embodiment. Here, encoding apparatus 121 according to the present embodiment has basically the same configuration and performs basically the same operations as encoding apparatus 101 shown in FIG. 2. Encoding apparatus 121 differs from encoding apparatus 101 in further having middle band encoding section 1103. Also, lower band encoding section 1101, middle band correcting section 1102, higher band encoding section 1104 and multiplexing section 1105 of encoding apparatus 121 differ from lower band encoding section 202, middle band correcting section 203, middle/higher band encoding section 204 and multiplexing section 205 of encoding apparatus 101 only in part of the operations.

Lower band encoding section 1101 differs from lower band encoding section 202 shown in FIG. 2 only in not outputting decoded lower band spectrum S_lo to higher band encoding section 1104. To be more specific, for example, lower band encoding section 1101 performs ITU-T recommendation G729.1 coding using lower/middle band signal X_lo of the 0 to 8 kHz band received as input from band split processing section 201, and outputs generated lower band encoded information to multiplexing section 1105. Further, lower band encoding section 1101 outputs frequency components of the middle band (i.e. the 7 to 8 kHz band) found in the process of providing lower band encoded information, to middle band correcting section 1102 as middle band spectrum X_mid. Lower band encoding section 1101 will be described in more detail later.

Middle band correcting section 1102 corrects middle band spectrum X_mid received as input form lower band encoding section 1101 in the frequency domain, and outputs the resulting spectrum to middle band encoding section 1103 as corrected middle band spectrum S_mid. That is, middle band correcting section 1102 differs from middle band correcting section 203 shown in FIG. 2 only in outputting generated, corrected middle band spectrum S_mid to middle band encoding section 1103, instead of higher band encoding section 1104. Also, correction processing of the middle band spectrum in middle band correcting section 1102 is the same as processing in middle band correcting section 203 in FIG. 2, and therefore detailed explanation will be omitted.

Middle band encoding section 1103 quantizes corrected middle band spectrum S_mid received as input from middle band correcting section 1102, and outputs the resulting middle band encoded information to multiplexing section 1105. Middle band encoding section 1103 will be described in more detail later.

Higher band encoding section 1104 quantizes a higher band signal of the 8 to 16 kHz band received as input from band split processing section 201, and outputs the resulting higher band encoded information to multiplexing section 1105. Higher band encoding section 1104 will be described in more detail later.

Multiplexing section 1105 multiplexes the lower band encoded information received as input from lower band encoding section 1101, the middle band encoded information received as input from middle band encoding section 1103 and the higher band encoded information received as input from higher band encoding section 1104, and outputs the multiplex result to transmission channel 102 as encoded information.

Figure 16:
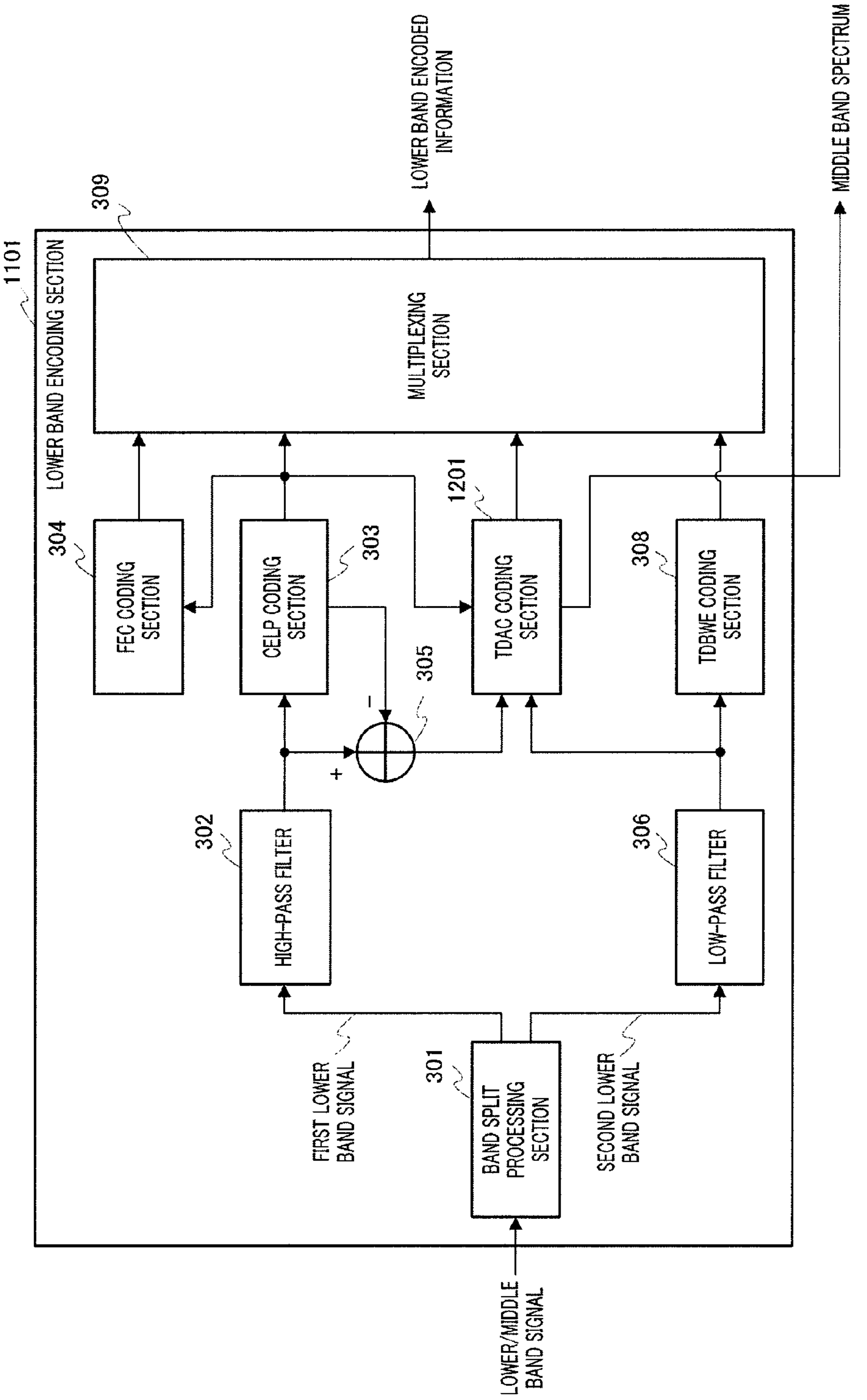
FIG. 16 is a block diagram showing the main configuration inside a lower band encoding section shown in FIG. 15.

FIG. 16 is a block diagram showing the main configuration inside lower band encoding section 1101 shown in FIG. 15. Here, lower band encoding section 1101 shown in FIG. 16 has basically the same configuration and performs basically the same operations as lower band encoding section 202 shown in FIG. 3. TDAC coding section 1201 of lower band encoding section 1101 differs from TDAC coding section 307 of lower band encoding section 202 only in part of the operations.

TDAC coding section 1201 differs from TDAC coding section 307 shown in FIG. 3 only in not outputting decoded lower band spectrum S_lo to higher band encoding section 1104. To be more specific, TDAC coding section 1201 applies orthogonal transform such as MDCT to a difference signal received as input from adder 305 and filtered second lower band signal received as input from low-pass filter 306, and, of the resulting frequency domain signal (i.e. MDCT coefficients) of the 0 to 8 kHz band, outputs the 7 to 8 kHz band part to middle band correcting section 1102 as middle band spectrum X_mid. Further, TDAC coding section 1201 quantizes the frequency domain signal (MDCT coefficients) acquired by orthogonal transform such as MDCT, and outputs the resulting TDAC parameters to multiplexing section 309.

Figure 17:
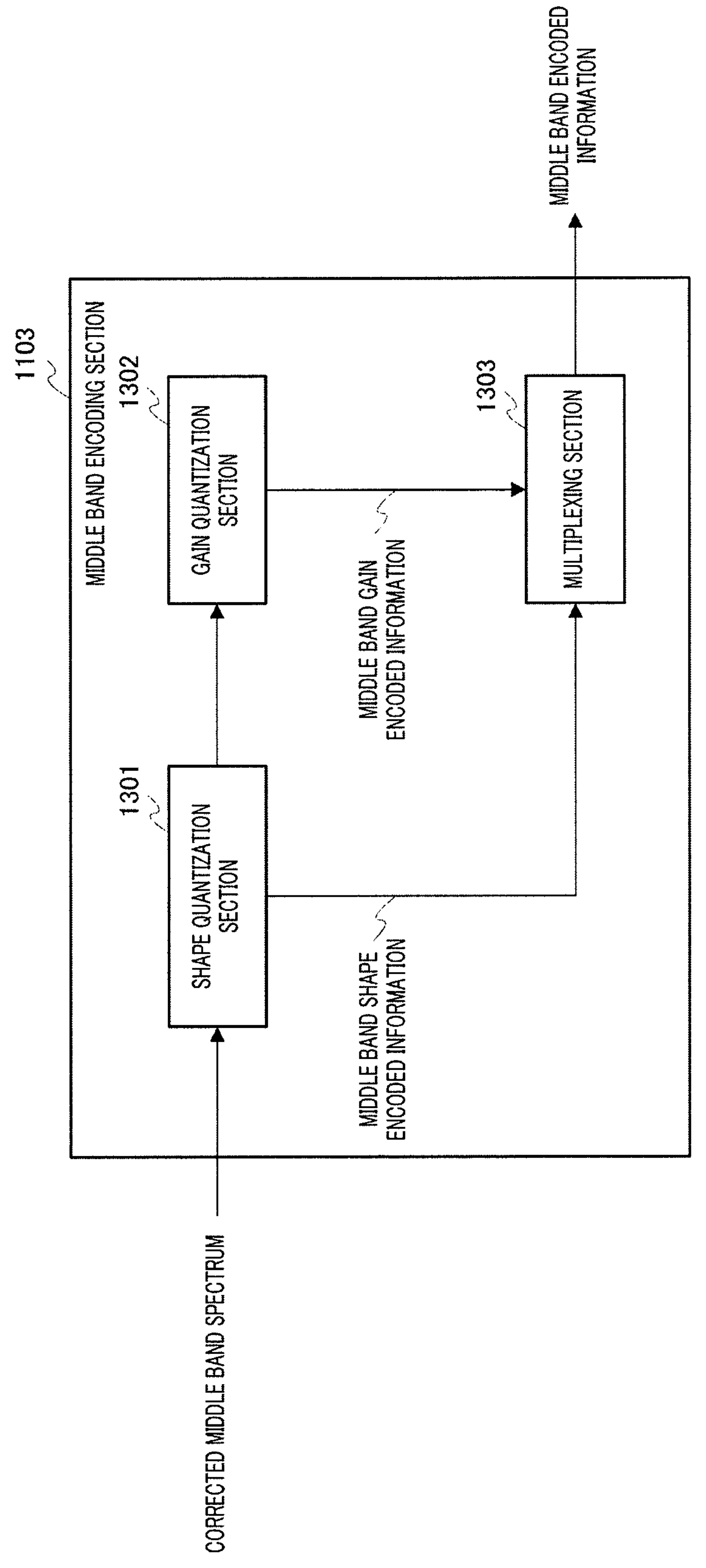
FIG. 17 is a block diagram showing the main configuration inside a middle band encoding section shown in FIG. 15.

FIG. 17 is a block diagram showing the main configuration inside middle band encoding section 1103 shown in FIG. 15.

In FIG. 17, middle band encoding section 1103 is provided with shape quantization section 1301, gain quantization section 1302 and multiplexing section 1303. These sections perform the following operations.

Shape quantization section 1301 performs shape quantization per subband, for corrected middle band spectrum S_mid'(k) received as input from middle band correcting section 1102. To be more specific, shape quantization section 1301 splits the middle band (i.e. the 7 to 8 kHz band) into L_mid subbands, and, in each subband, finds the index of the shape code vector to maximize the result of following equation 20 by searching a built-in shape codebook comprised of SQ_mid shape code vectors.

(Equation 20)

$$\text{Shape\_q}(i) = \frac{\left\{\sum_{k'=0}^{W(j)} (\text{S\_mid}'_{k'+B(j)} \cdot SC^i_{k'})\right\}^2}{\sum_{k'=0}^{W(j)} SC^i_{k'} \cdot SC^i_{k'}} \quad [20]$$

$$(j = 0, \ldots, \text{L\_mid} - 1, \quad i = 0, \ldots, \text{SQ\_mid} - 1)$$

In equation 20, $SC^i_{k'}$ represents a shape code vector forming the shape codebook, i represents the shape code vector index, and k' represents the index of a shape code vector element. Also, W(j) represents the bandwidth of the subband of subband index j. Also, B(j) represents the index of the head sample of the subband of subband index j.

Shape quantization section 1301 outputs index S_max_mid of the shape code vector to maximize the result of above equation 20, to multiplexing section 1303 as middle band shape encoded information. Further, according to following equation 21, shape quantization section 1301 calculates and outputs ideal gain value Gain_i_mid(j) to gain quantization section 1302.

(Equation 21)

$$\text{Gain\_i\_mid}(j) = \frac{\sum_{k'=0}^{W(j)} \left(\text{S\_mid}'_{k'+B(j)} \cdot SC^{S\_max\_mid}_{k'}\right)}{\sum_{k'=0}^{W(j)} SC^{S\_max\_mid}_{k'+B(j)} \cdot SC^{S\_max\_mid}_{k'+B(j)}} \quad [21]$$

$$(j = 0, \ldots, \text{L\_mid} - 1)$$

Gain quantization section 1302 quantizes ideal gain value Gain_i_mid(j) received as input from shape quantization section 1301, according to following equation 22. Here, gain quantization section 1302 performs vector quantization using the ideal gain value as an L_mid-dimensional vector. Also, in equation 22, $GC^i_j$ represents a gain code vector forming the gain codebook, i represents the gain code vector index, and j represents the index of a gain code vector element.

(Equation 22)

$$\text{Gain\_q}(i) = \sum_{j=0}^{L\_mid-1} \{\text{Gain\_i\_mid}(j) - GC^i_j\}^2 \quad [22]$$

$$(i = 0, \ldots, \text{GQ\_mid} - 1)$$

Here, the codebook index to minimize above equation 22 is expressed as G_min_mid.

Gain quantization section 1302 outputs G_min_mid to multiplexing section 1303 as middle band gain encoded information.

Multiplexing section 1303 multiplexes the middle band shape encoded information received as input from shape quantization section 1301 and the middle band gain encoded information received as input from gain quantization section 1302, and outputs the multiplex result to multiplexing section 1105 as middle band encoded information.

Figure 18:
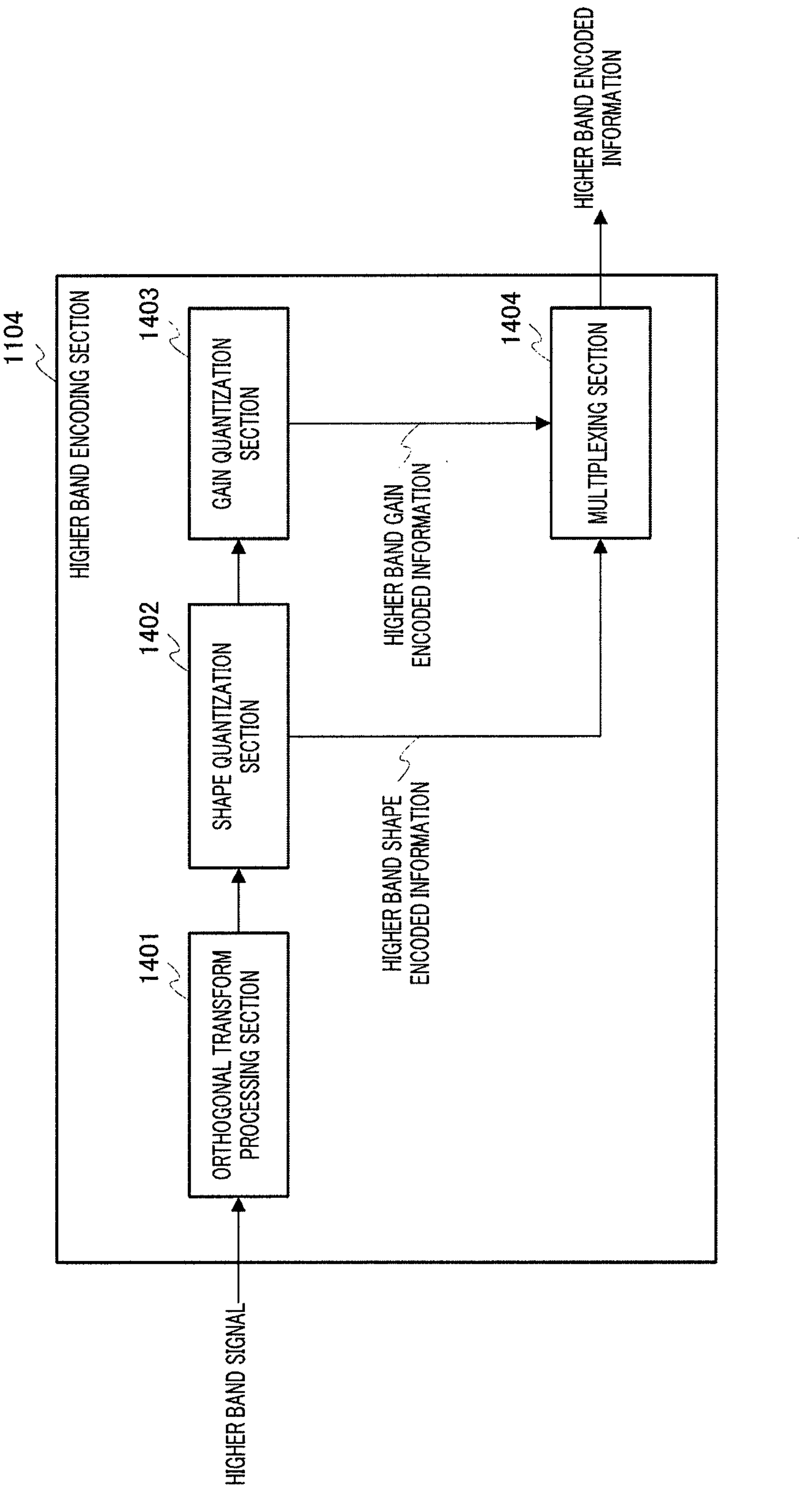
FIG. 18 is a block diagram showing the main configuration inside a higher band encoding section shown in FIG. 15.

FIG. 18 is a block diagram showing the main configuration inside higher band encoding section 1104 shown in FIG. 15.

In FIG. 18, higher band encoding section 1104 is provided with orthogonal transform processing section 1401, shape quantization section 1402, gain quantization section 1403 and multiplexing section 1404. These sections perform the following operations.

Orthogonal transform processing section 1401 performs orthogonal transform processing such as MDCT on a higher band signal (of the 8 to 16 kHz band) received as input from band split processing section 201, and calculates and outputs higher band spectrum S_hi, which is the frequency component of the higher band signal, to shape quantization section 1402. Here, the orthogonal transform processing such as MDCT in orthogonal transform processing section 1401 is the same as the orthogonal transform processing such as MDCT in orthogonal transform processing section 401 according to Embodiment 1, and therefore detailed explanation will be omitted.

Shape quantization section 1402 performs shape quantization per subband, for higher band spectrum S_hi received as input from orthogonal transform processing section 1401. To be more specific, shape quantization section 1402 splits the higher band (i.e. the 8 to 16 kHz band) into L_hi subbands, and, in each subband, finds the index of the shape code vector to maximize the result of following equation 23 by searching a built-in shape codebook comprised of SQ_hi shape code vectors.

(Equation 23)

$$\text{Shape\_q}(i) = \frac{\left\{\sum_{k'=0}^{W(j)} (\text{S\_hi}_{k'+B(j)} \cdot SC^i_{k'})\right\}^2}{\sum_{k'=0}^{W(j)} SC^i_{k'} \cdot SC^i_{k'}} \quad [23]$$

$$(j = 0, \ldots, \text{L\_hi} - 1, \quad i = 0, \ldots, \text{SQ\_hi} - 1)$$

In equation 23, $SC^i_{k'}$ represents a shape code vector forming the shape codebook, i represents the shape code vector index, and k' represents the index of a shape code vector element. Also, W(j) represents the bandwidth of the subband of subband index j. Also, B(j) represents the index of the head sample of the subband of subband index j.

Shape quantization section 1402 outputs index S_max_hi of the shape code vector to maximize the result of above equation 23, to multiplexing section 1404 as higher band shape encoded information. Further, according to following equation 24, shape quantization section 1402 calculates and outputs ideal gain value Gain_i_hi(j) to gain quantization section 1403.

(Equation 24)

$$\text{Gain\_i\_hi}(j) = \frac{\sum_{k'=0}^{W(j)} \left(\text{S\_hi}_{k'+B(j)} \cdot SC_{k'}^{S\_max\_hi}\right)}{\sum_{k'=0}^{W(j)} SC_{k'+B(j)}^{S\_max\_hi} \cdot SC_{k'+B(j)}^{S\_max\_hi}} \quad [24]$$

$(j = 0, \ldots, \text{L\_hi} - 1)$

Gain quantization section 1403 quantizes ideal gain value Gain_i_hi(j) received as input from shape quantization section 1402, according to following equation 25. Here, gain quantization section 1403 performs vector quantization using the ideal gain value as an L-dimensional vector. Also, in equation 25, $GC^i_j$ represents a gain code vector forming the gain codebook, i represents the gain code vector index, and j represents the index of a gain code vector element. Here, gain quantization section 1403 uses a different codebook from in gain quantization section 1302.

(Equation 25)

$$\text{Gain\_q}(i) = \sum_{j=0}^{L\_hi-1} \{\text{Gain\_i\_hi}(j) - GC^i_j\}^2 \quad [25]$$

$(i = 0, \ldots, \text{GQ\_hi} - 1)$

Here, the codebook index to minimize above equation 25 is expressed as G_min_hi.

Gain quantization section 1403 outputs G_min_hi to multiplexing section 1404 as higher band gain encoded information.

Multiplexing section 1404 multiplexes the higher band shape encoded information received as input from shape quantization section 1402 and the higher band gain encoded information received as input from gain quantization section 1403, and outputs the multiplex result to multiplexing section 1105 as higher band encoded information.

Figure 19:
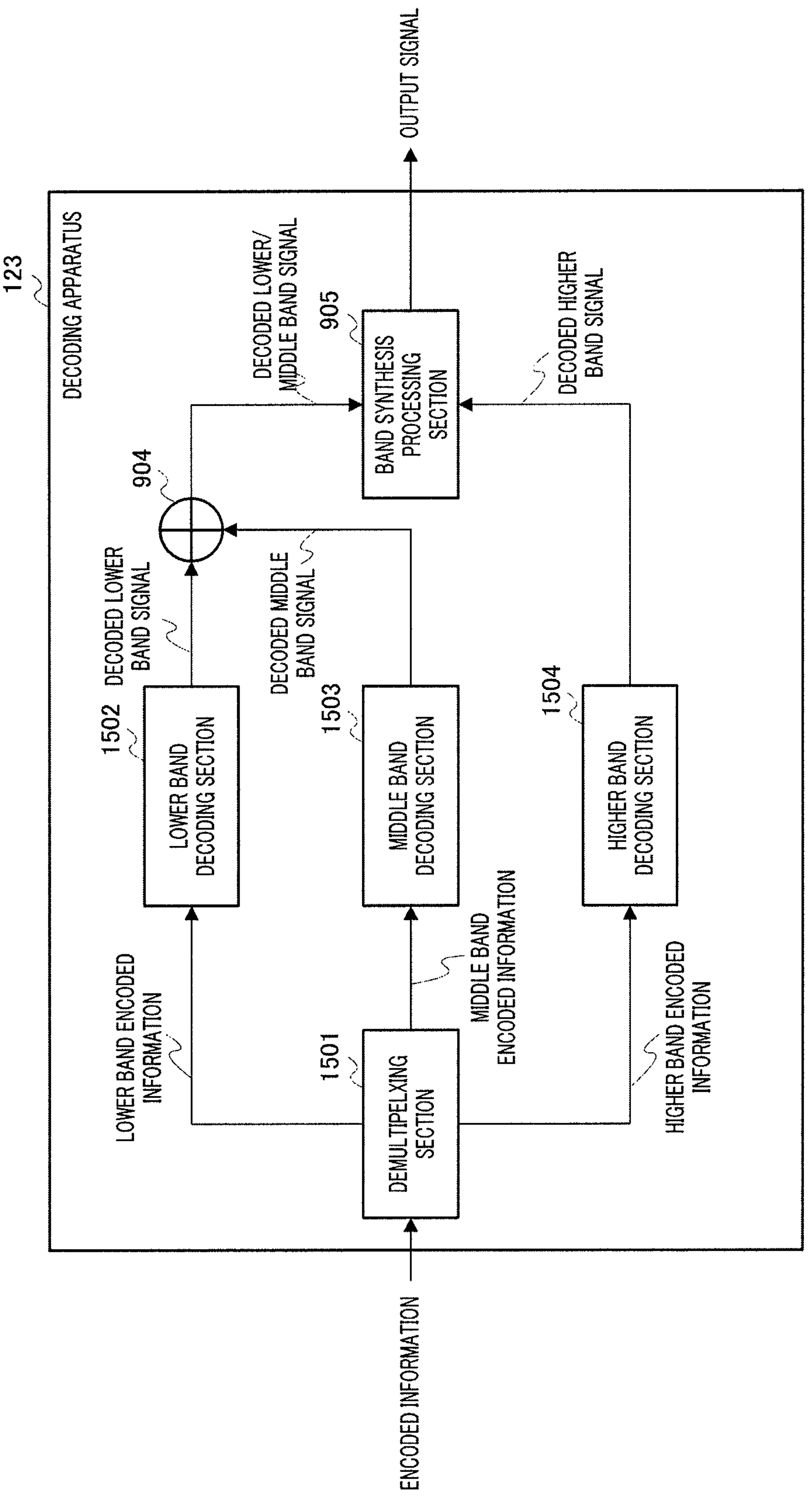
FIG. 19 is a block diagram showing the main configuration inside a decoding apparatus according to Embodiment 3 of the present invention.

FIG. 19 is a block diagram showing the main configuration inside decoding apparatus 123 according to the present embodiment. Also, decoding apparatus 123 according to the present embodiment has basically the same configuration and performs basically the same operations as decoding apparatus 113 shown in FIG. 13. Demultiplexing section 1501, lower band decoding section 1502, middle band decoding section 1503 and higher band decoding section 1504 of decoding apparatus 123 differ from demultiplexing section 601, lower band decoding section 901, middle band decoding section 903 and higher band decoding section 902 of decoding apparatus 113 only in part of the operations.

Demultiplexing section 1501 demultiplexes encoded information transmitted from encoding apparatus 121 via transmission channel 102, into the lower band encoded information, middle band encoded information and higher band encoded information, and outputs the lower band encoded information to lower band decoding section 1502, the middle band encoded information to middle band decoding section 1503 and the higher band encoded information to higher band decoding section 1504.

Lower band decoding section 1502 differs from lower band decoding section 901 shown in FIG. 13 only in not outputting a decoded lower band spectrum to higher band decoding section 1504. Lower band decoding section 1502 decodes the lower band encoded information received as input from demultiplexing section 1501, and outputs a generated, decoded lower band signal to adding section 904. Here, the configuration and operations of lower band decoding section 1502 are basically the same as the configuration and operations of lower band decoding section 901 according to Embodiment 2, and therefore detailed explanation will be omitted.

Middle band decoding section 1503 differs from middle band decoding section 903 shown in FIG. 13 in not receiving as input a decoded middle band spectrum from higher band decoding section 1504. Middle band decoding section 1503 decodes the middle band encoded information received as input from demultiplexing section 1501, and outputs the resulting decoded middle band signal to adding section 904. Middle band decoding section 1503 will be described in more detail later.

Higher band decoding section 1504 differs from higher band decoding section 902 shown in FIG. 13 in not receiving as input a decoded lower band spectrum from lower band decoding section 1502 and in not outputting a decoded middle band spectrum to middle band decoding section 1503. To be more specific, higher band decoding section 1504 decodes the higher band encoded information received as input from demultiplexing section 1501, and outputs the resulting decoded higher band signal to band synthesis processing section 905. Higher band decoding section 1504 will be described in more detail later.

Figure 20:
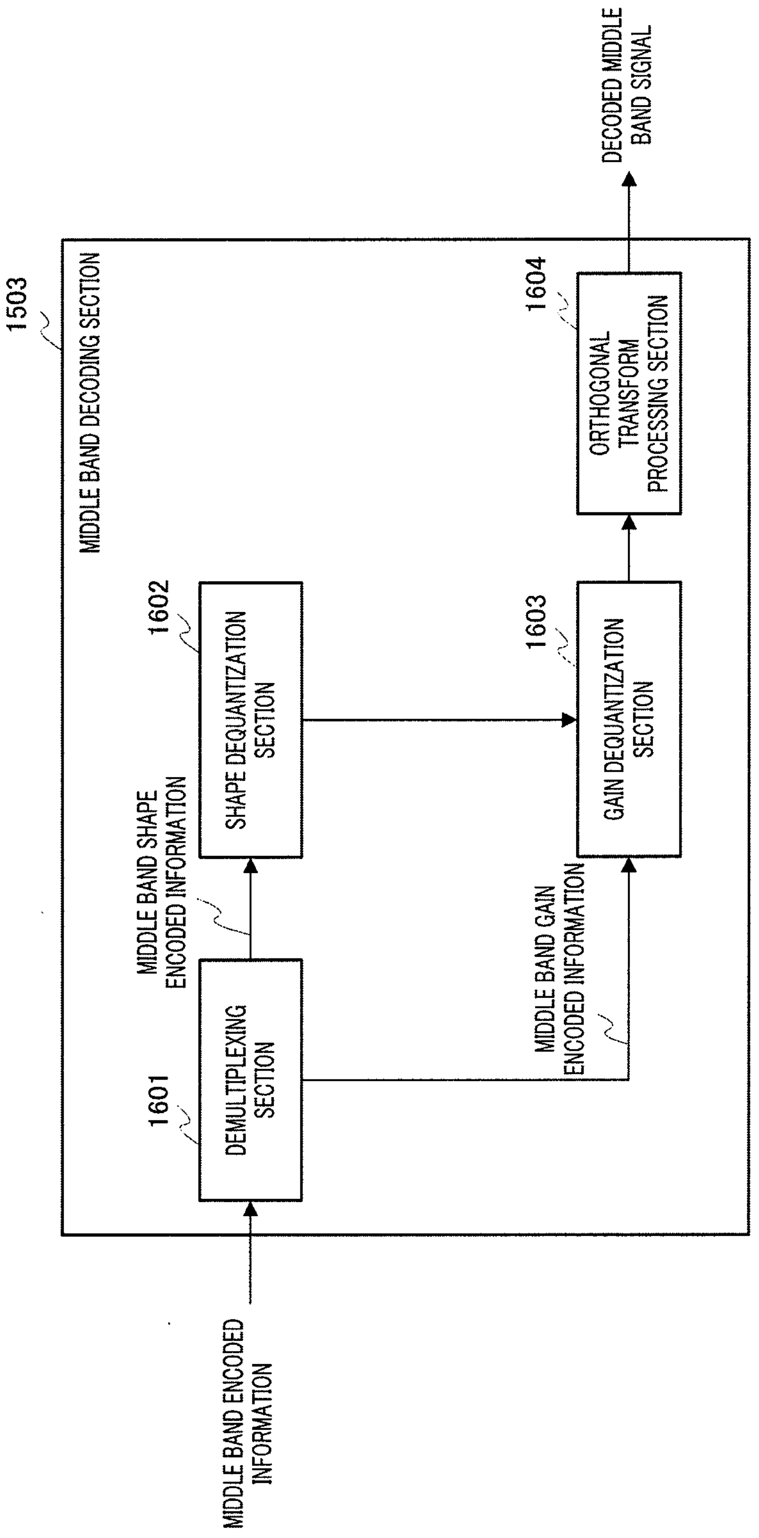
FIG. 20 is a block diagram showing the main configuration inside a middle band decoding section shown in FIG. 19.

FIG. 20 is a block diagram showing the main configuration inside middle band decoding section 1503 shown in FIG. 19.

In FIG. 20, middle band decoding section 1503 is provided with demultiplexing section 1601, shape dequantization section 1602, gain dequantization section 1603 and orthogonal transform processing section 1604. These sections perform the following operations.

Demultiplexing section 1601 demultiplexes middle band encoded information received as input from demultiplexing section 1501 into middle band shape encoded information S_max_mid and middle band gain encoded information G_min_mid, and outputs middle band shape encoded information S_max_mid to shape dequantization section 1602 and middle band gain encoded information G_min_mid to gain dequantization section 1603.

Shape dequantization section 1602 calculates the shape value by dequantizing the middle band shape encoded information received as input from demultiplexing section 1601, and outputs the calculated shape value to gain dequantization section 1603. To be more specific, shape dequantization section 1602 internally has the same shape codebook as the shape codebook provided in shape quantization section 1301 of encoding apparatus 121, and searches for a shape code vector having, as an index, middle band shape encoded information S_max_mid received as input from demultiplexing section 1601. Further, shape dequantization section 1602 outputs the searched code vector to gain dequantization section 1603 as the shape value. Here, the shape code vector searched for as the shape value is expressed as Shape_q_mid(k') (k'=B(j), . . . B(j+L_mid)−1).

Gain dequantization section 1603 calculates the gain value by dequantizing the middle band gain encoded information received as input from demultiplexing section 1601. Also, gain dequantization section 1603 calculates a decoded middle band spectrum from the calculated gain value and the shape value received as input from shape dequantization section 1602. Further, gain dequantization section 1603 outputs the calculated, decoded middle band spectrum to orthogonal transform processing section 1604.

To be more specific, gain dequantization section 1603 internally has the same gain codebook as the gain codebook provided in gain quantization section 1302 of encoding apparatus 121, and dequantizes the gain value using this gain codebook, according to following equation 26. In this case, gain dequantization section 1603 performs vector dequantization using the gain value as an L_mid-dimensional vector. That is, gain dequantization section 1603 uses gain code vector $GC_j^{G\_min\_mid}$ associated with gain encoded information G_min_mid, as is as the gain value.

(Equation 26)

$$\text{Gain\_}q'(j)=GC_j^{G\_min\_mid}(j=0, \ldots, L\text{\_mid}-1) \quad [26]$$

Next, gain dequantization section 1603 calculates decoded MDCT coefficient S_mid2'(k) according to following equation 27, using the gain value acquired by dequantization in the current frame and the shape value received as input from shape dequantization section 1602. Here, in equation 27, k is the value between 0 and $N_{mid\_hi}-1$, calculated from k' and j. Gain dequantization section 1603 outputs calculated, decoded MDCT coefficient S_mid2'(k) to orthogonal transform processing section 1604 as a decoded middle band spectrum.

(Equation 27)

$$\text{S\_mid2}'(k) = \text{Gain\_q}'(j)\cdot\text{Shape\_q}'(k')\begin{pmatrix} k = BL(j)+k' \;\; (k=0, \ldots, N_{mid\_hi}-1) \\ BL(j) \le k' \le BH(j), \;\; \text{for all } j \\ j = 0, \ldots, \text{L\_mid}-1 \end{pmatrix} \quad [27]$$

Orthogonal transform processing section 1604 generates a time domain signal by performing orthogonal transform processing such as inverse MDCT on the decoded middle band spectrum received as input from gain dequantization section 1603, and outputs this signal to adding section 904 as a decoded middle band signal. Also, orthogonal transform processing in orthogonal transform processing section 1604 is the same as the orthogonal transform processing in orthogonal transform processing section 806 according to Embodiment 1 (see FIG. 12), and therefore detailed explanation will be omitted.

Figure 21:
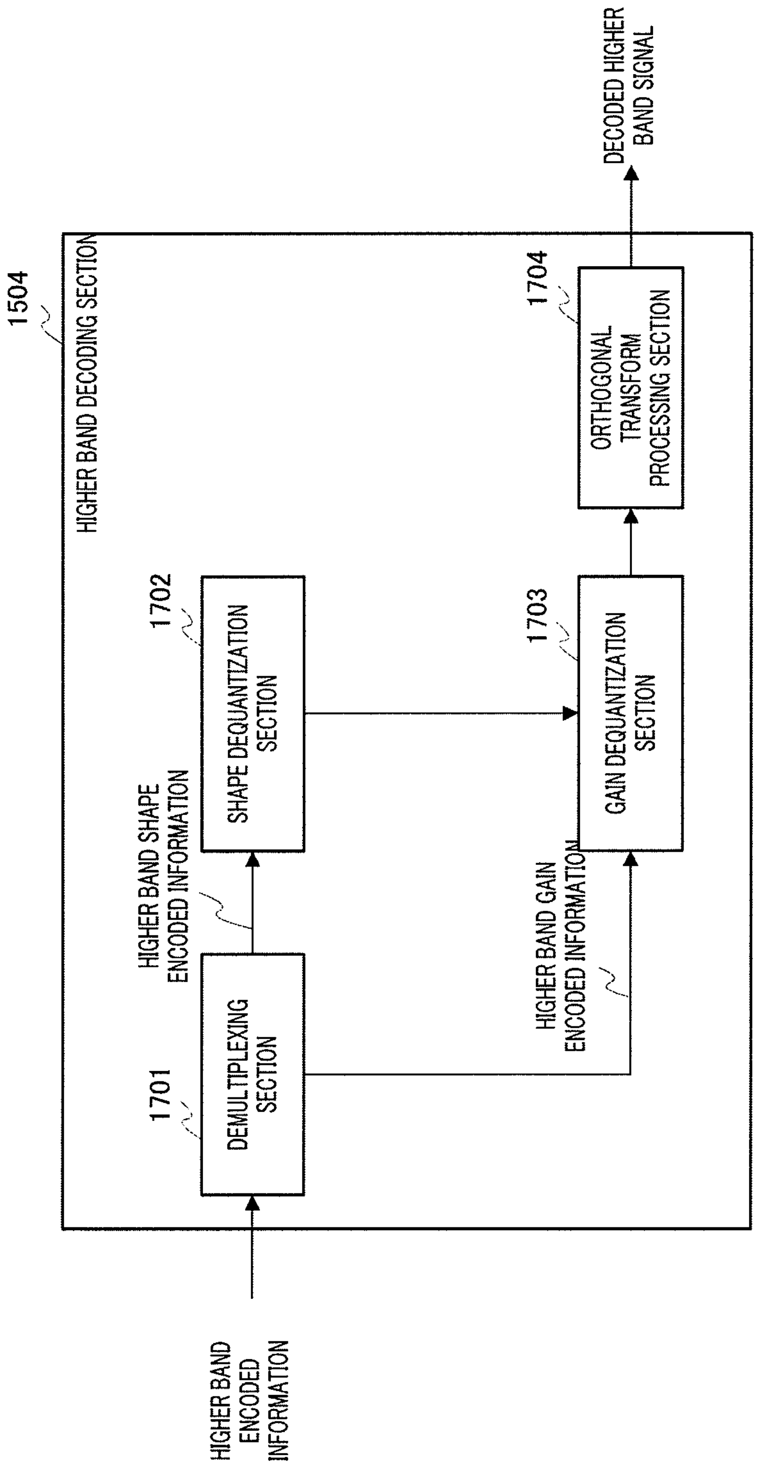
FIG. 21 is a block diagram showing the main configuration inside a higher band decoding section shown in FIG. 19.

FIG. 21 is a block diagram showing the main configuration inside higher band decoding section 1504 shown in FIG. 19.

In FIG. 21, higher band decoding section 1504 is provided with demultiplexing section 1701, shape dequantization 1702, gain dequantization section 1703 and orthogonal transform processing section 1704. These sections perform the following operations.

Demultiplexing section 1701 demultiplexes higher band encoded information received as input from demultiplexing section 1501 into higher band shape encoded information S_max_hi and higher band gain encoded information G_min_hi, and outputs higher band shape encoded information S_max_hi to shape dequantization section 1702 and higher band gain encoded information G_mid_hi to gain dequantization section 1703.

Shape dequantization section 1702 calculates the shape value by dequantizing higher band shape encoded information S_max_hi received as input from demultiplexing section 1701, and outputs the calculated shape value to gain dequantization section 1703.

Gain dequantization section 1703 calculates the gain value by dequantizing higher band gain encoded information G_min_hi received as input from demultiplexing section 1701. Also, gain dequantization section 1703 calculates a decoded higher band spectrum from the calculated gain value and the shape value received as input from shape dequantization section 1702, and outputs the decoded higher band spectrum to orthogonal transform processing section 1704. Also, processing such as dequantization in gain dequantization section 1703 is basically the same as processing such as dequantization in gain dequantization section 1603 (see FIG. 20), and therefore detailed explanation will be omitted.

Orthogonal transform processing section 1704 generates a time domain signal by performing orthogonal transform processing such as inverse MDCT on the decoded higher band spectrum received as input from gain dequantization section 1703, and outputs this signal to band synthesis processing section 905 as a decoded higher band signal. Also, orthogonal transform processing in orthogonal transform processing section 1704 is the same as the orthogonal transform processing in orthogonal transform processing section 806 according to Embodiment 1 (see FIG. 12), and therefore detailed explanation will be omitted.

Thus, according to the present embodiment, the encoding side splits the band of an input signal into the lower band component and the higher band component by QMF and so on, encodes these components in separate encoding sections, and reconstructs and encodes a band component lost by adopting a low-pass filter in the lower band coding process. Also, the decoding side decodes the lower band component, the above reconstructed band component and the higher band component in separate decoding sections. Therefore, even in a case where the higher band component is encoded without extension coding using the lower band component, it is possible to reconstruct and encode a band component lost by adopting a low-pass filter in the lower band coding process, and improve the quality of decoded signals.

Embodiments of the present invention have been described above.

Also, in the above embodiments, as for the configuration for sequentially multiplexing encoded information and parameters in two steps upon multiplexing (e.g. multiplexing section 309 and multiplexing section 205), multiplexing may be performed collectively in the multiplexing section of the second stage without providing the multiplexing section of the first stage. Contrary, upon demultiplexing multiplexed encoded information, parameters and so on, as for the configuration for sequentially performing demultiplexing in two steps (e.g. demultiplexing section 601 and demultiplexing section 701), demultiplexing may be performed sequentially in the multiplexing section of the first stage without providing the demultiplexing section of the second stage.

Also, the encoding apparatus, decoding apparatus, and encoding and decoding methods according to the present invention are not limited to the above embodiments, and can be implemented with various changes. For example, it is equally possible to adequately combine and implement the above embodiments.

Also, although the decoding apparatus of the above embodiments performs processing using encoded information outputted from the encoding apparatus of the above embodiments, the present invention is not limited to this, and, even if encoded information is not transmitted from the encoding apparatus, the decoding apparatus can perform processing as long as this encoded data contains necessary parameters and data.

Also, the encoding apparatus and decoding apparatus according to the present invention can be mounted on a communication terminal apparatus and base station apparatus in a mobile communication system, so that it is possible to provide a communication terminal apparatus, base station apparatus and mobile communication system having the same operational effects as above.

Although example cases have been described with the above embodiments where the present invention is implemented with hardware, the present invention can be implemented with software.

Also, the present invention is applicable even to a case where a signal processing program is operated after being recorded or written in a mechanically readable recording medium such as a memory, disk, tape, CD, and DVD, so that it is possible to provide the same operations and effects as in the present embodiments.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-015650, filed on Jan. 25, 2008, and Japanese Patent Application No. 2008-129711, filed on May 16, 2008, including the specifications, drawings and abstracts, are incorporated herein by reference in their entireties.

INDUSTRIAL APPLICABILITY

The encoding apparatus, decoding apparatus, and encoding and decoding methods according to the present invention can improve the quality of decoded signals upon splitting the band of an input signal into the lower band component and higher band component by QMF and so on, and encoding these components in separate encoding sections, and are applicable to a packet communication system, mobile communication system, and so on.

The invention claimed is:

1. An encoding apparatus, comprising:

a band splitter that performs band split processing of an input signal, and provides a lower/middle band component lower than a first frequency and a higher band component one of equal to and higher than the first frequency;

a lower band encoder that provides a lower band component by suppressing a part one of equal to and higher than a second frequency in the lower/middle band component, and provides lower band encoded information by encoding the lower band component;

a middle band corrector that corrects a middle band component one of equal to and higher than the second frequency in the suppressed lower/middle band component, and provides a corrected middle band component; and a middle/higher band encoder that encodes the corrected middle band component and the higher band component, and provides middle/higher band encoded information, wherein the lower band encoder comprises:

a low-pass filter that suppresses the middle band component by performing low-pass filtering of the lower/middle band component, and provides the lower band component; and an encoder that provides the lower band encoded information by encoding the lower band component, and further provides a spectrum of the middle band component in a coding process, and the middle band corrector provides the corrected middle band component by multiplying the spectrum by a reciprocal of a characteristic of the low-pass filter.

2. The encoding apparatus according to claim 1, wherein the middle band corrector multiplies the corrected middle band component by a correction coefficient less than 1.

3. The encoding apparatus according to claim 1, wherein the encoder further decodes the lower band encoded information, and provides a decoded lower band spectrum, and the middle/higher band encoder comprises:

an orthogonal transformer that performs orthogonal transform of the higher band component, and provides a higher band spectrum;

a middle/higher band spectrum former that forms a middle/higher band spectrum with the higher band spectrum and the corrected middle band component; and a band extender that performs band extension processing using the decoded lower band spectrum and the middle/higher band spectrum, and, as the middle/higher band encoded information, provides a parameter for estimating the middle/higher band spectrum from the decoded lower band spectrum.

4. The encoding apparatus according to claim 3, wherein the middle/higher band spectrum former provides a middle band spectrum by performing orthogonal transform of the corrected middle band component, and the middle band corrector smoothes the middle band spectrum when a spectral flatness measure of the corrected middle band component is less than a predetermined threshold.

5. The encoding apparatus according to claim 1, wherein the middle/higher band encoder comprises:

a middle band encoder that quantizes a shape and a gain of the corrected middle band component, and provides middle band encoded information;

a higher band encoding section that quantizes a shape and a gain of the higher band spectrum, and provides higher band encoded information; and a multiplexer that multiplexes the middle band encoded information and the higher band encoded information, and provides the middle/higher band encoded information.

6. A decoding apparatus, comprising:

a receiver that receives lower band encoded information and middle/higher band encoded information, the lower band encoded information encoding a lower band component acquired by suppressing a part one of equal to and higher than a second frequency in a lower/middle band component, which is lower than a first frequency and which is acquired by splitting a band of an input signal in an encoding apparatus, and the middle/higher band encoded information encoding a corrected middle band component acquired by correcting a middle band component one of equal to and higher than the second frequency in the suppressed lower/middle band component, and encoding a higher band component, which is one of equal to and higher than the first frequency and which is acquired by splitting the band;

a lower/middle band decoder that decodes the lower band encoded information, and provides a decoded lower band spectrum; and a higher band decoder that decodes the middle/higher band encoded information using the decoded lower band spectrum, and provides a decoded higher band signal and decoded middle band spectrum, wherein the lower band encoded information is acquired by encoding the lower band component, the lower band component being acquired by performing low-pass filtering of the lower/middle band component, and the corrected middle band component is acquired by multiplying a spectrum of the middle band component, acquired in an encoding process, by a reciprocal of a characteristic of a low-pass filter.

7. The decoding apparatus according to claim 6, wherein the lower/middle band decoder comprises:

a lower band decoder that decodes the lower band encoded information, and provides the decoded lower band spectrum and a decoded lower band signal;

a middle band decoder that decodes the decoded middle band spectrum, and provides a decoded middle band signal; and an adder that adds the decoded lower band signal and the decoded middle band signal, and provides a decoded lower/middle band signal.

8. An encoding method, comprising:

performing band split processing of an input signal, and providing a lower/middle band component lower than a first frequency and a higher band component one of equal to and higher than the first frequency;

providing a lower band component by suppressing a part one of equal to and higher than a second frequency in the lower/middle band component, and providing lower band encoded information by encoding the lower band component;

correcting a middle band component one of equal to and higher than the second frequency in the suppressed lower/middle band component, and providing a corrected middle band component; and encoding the corrected middle band component and the higher band component, and providing middle/higher band encoded information, wherein:

the providing of the lower band component comprises:

suppressing the middle band component by performing low-pass filtering of the lower/middle band component, and providing the lower band component; and providing the lower band encoded information by encoding the lower band component, and further providing a spectrum of the middle band component in a coding process; and the correcting of the middle band component comprises:

multiplying the spectrum by a reciprocal of a characteristic of a low-pass filter.

9. A decoding method, comprising:

receiving lower band encoded information and middle/higher band encoded information, the lower band encoded information encoding a lower band component acquired by suppressing a part one of equal to and higher than a second frequency in a lower/middle band component, which is lower than a first frequency and which is acquired by splitting a band of an input signal in an encoding apparatus, and the middle/higher band encoded information encoding a corrected middle band component acquired by correcting a middle band component one of equal to and higher than the second frequency in the suppressed lower/middle band component, and encoding a higher band component, which is one of equal to and higher than the first frequency and which is acquired by splitting the band;

decoding the lower band encoded information, and providing a decoded lower band spectrum; and decoding the middle/higher band encoded information using the decoded lower band spectrum, and providing a decoded higher band signal and decoded middle band spectrum, wherein the lower band encoded information is acquired by encoding the lower band component, the lower band component being acquired by performing low-pass filtering of the lower/middle band component, and the corrected middle band component is acquired by multiplying a spectrum of the middle band component, acquired in an encoding process, by a reciprocal of a characteristic of a low-pass filter.

* * * * *